(12) United States Patent
DeCarli et al.

(10) Patent No.: US 10,219,447 B1
(45) Date of Patent: Mar. 5, 2019

(54) CONTAINER SYSTEM AND METHOD OF USE FOR FARMING

(71) Applicant: FARM FROM A BOX, INC., San Francisco, CA (US)

(72) Inventors: Brandi DeCarli, San Francisco, CA (US); Scott Thompson, San Francisco, CA (US)

(73) Assignee: Farm from a Box, Inc., San Francisco, CA (US)

( * ) Notice: Subject to any disclaimer, the term of this patent is extended or adjusted under 35 U.S.C. 154(b) by 0 days.

(21) Appl. No.: 15/725,248

(22) Filed: Oct. 4, 2017

Related U.S. Application Data

(63) Continuation-in-part of application No. 15/152,011, filed on May 11, 2016, now abandoned.
(Continued)

(51) Int. Cl.
*A01G 9/16* (2006.01)
*E04B 1/34* (2006.01)
(Continued)

(52) U.S. Cl.
CPC ............... *A01G 9/16* (2013.01); *A01G 9/242* (2013.01); *A01G 9/246* (2013.01); *B65D 88/005* (2013.01);
(Continued)

(58) Field of Classification Search
CPC ......... E04H 5/08; E04H 1/005; B65D 88/022; B65D 90/008; E04B 1/34305; H02S 40/38; F21V 33/006
(Continued)

(56) References Cited

U.S. PATENT DOCUMENTS

| 4,421,943 A | 12/1983 | Withjack |
| 5,649,432 A * | 7/1997 | Cavalea, III ......... B65D 88/022 220/1.5 |

(Continued)

FOREIGN PATENT DOCUMENTS

WO    2013/120129 A1    8/2013

OTHER PUBLICATIONS

The Coca-Cola Company, "EKOCENTER: Empowering Community Well-Being Through Social Enterprise," http://www.coca-colacompany.com/stories/ekocenter-empowering-community-well-being-through-social-enterprise/, Sep. 24, 2013 (downloaded from the internet on May 11, 2016).

(Continued)

*Primary Examiner* — Patrick J Maestri
(74) *Attorney, Agent, or Firm* — Winston & Strawn LLP

(57) ABSTRACT

The invention provides a farm from a box system and at least one container that includes all components and tools required to assist communities in being able to conduct agricultural activities in order to provide sufficient food for or for other off-grid localized food production, e.g., for schools, correctional facilities, etc. The at least one container is provided in a compact form for shipping to locations where needed and provides the necessary tools, agricultural supplies, power and irrigation to facilitate growth of sustainable crops. The invention also provides a method of use of the systems and containers described herein for assisting people in farming activities conducted outside of the containers, thus enabling the system owner to successfully and efficiently conduct organic and small scale farming.

19 Claims, 18 Drawing Sheets

Related U.S. Application Data

(60) Provisional application No. 62/160,346, filed on May 12, 2015.

(51) Int. Cl.
*A01G 9/24* (2006.01)
*B65D 88/52* (2006.01)
*E04B 1/344* (2006.01)
*B65D 88/00* (2006.01)
*E04H 1/12* (2006.01)
*E04F 10/02* (2006.01)

(52) U.S. Cl.
CPC ............ *B65D 88/52* (2013.01); *E04B 1/3442* (2013.01); *E04F 10/02* (2013.01); *E04H 2001/1283* (2013.01)

(58) Field of Classification Search
USPC .................................................. 52/90.1, 92.1
See application file for complete search history.

(56) References Cited

U.S. PATENT DOCUMENTS

| | | | |
|---|---|---|---|
| 5,711,566 | A | 1/1998 | Lesmeister et al. |
| 6,048,167 | A | 4/2000 | Lesmeister et al. |
| 6,598,354 | B2 | 7/2003 | McManus et al. |
| 7,230,819 | B2 | 6/2007 | Muchow et al. |
| 7,418,802 | B2 | 9/2008 | Sarine et al. |
| 8,593,102 | B2 | 11/2013 | McGuire et al. |
| 8,720,126 | B2 | 5/2014 | Strickland et al. |
| 2008/0196758 | A1 | 8/2008 | McGuire |
| 2010/0206354 | A1 | 8/2010 | Greene, Jr. et al. |
| 2012/0006369 | A1 | 1/2012 | Cantin et al. |
| 2012/0151851 | A1 | 6/2012 | Cantin et al. |
| 2012/0261407 | A1 | 10/2012 | Cross et al. |
| 2013/0186010 | A1 | 7/2013 | Condie |
| 2014/0116486 | A1 | 5/2014 | Combs et al. |
| 2014/0137468 | A1* | 5/2014 | Ching .................. A01G 9/16 47/17 |
| 2014/0246425 | A1 | 9/2014 | Janin |

OTHER PUBLICATIONS

EcoSphere, "About the EcoSphere Closed Ecosystem," http://ecosphere.com/about-the-ecosphere-closed-ecosystem/ (downloaded from the internet on May 11, 2016).

Cardinal Resources, "Overview, the Red Bird System," http://www.cardinalres.com/red-bird/overview (downloaded from the internet on May 11, 2016).

U.S. Appl. No. 15/152,011, Restriction Requirement, dated Nov. 29, 2016.

U.S. Appl. No. 15/152,011, Non-Final Rejection, dated Feb. 21, 2017.

U.S. Appl. No. 15/152,011, Final Rejection, dated Jun. 8, 2017.

U.S. Appl. No. 15/152,011, Advisory Action, dated Aug. 16, 2017.

* cited by examiner

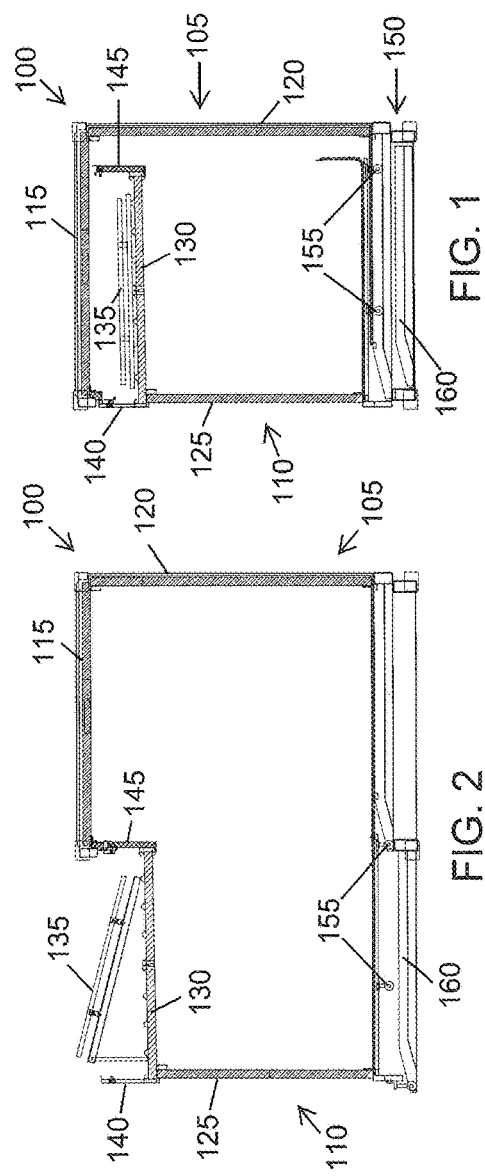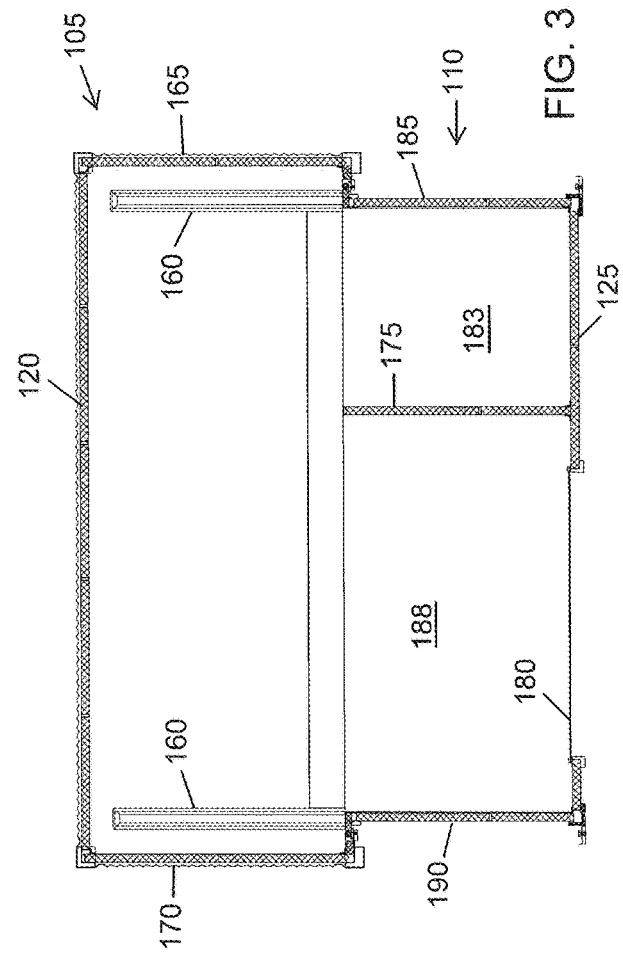

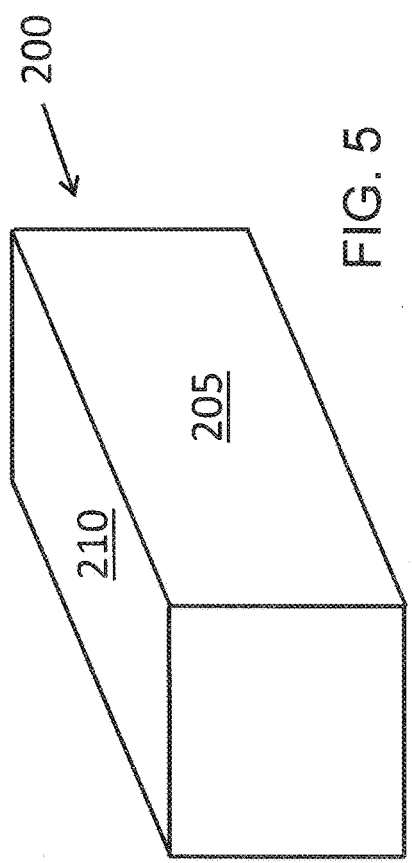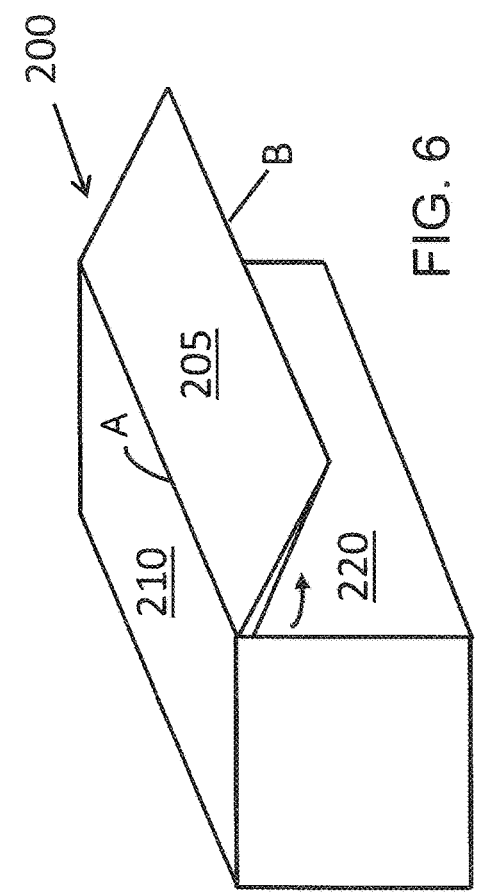

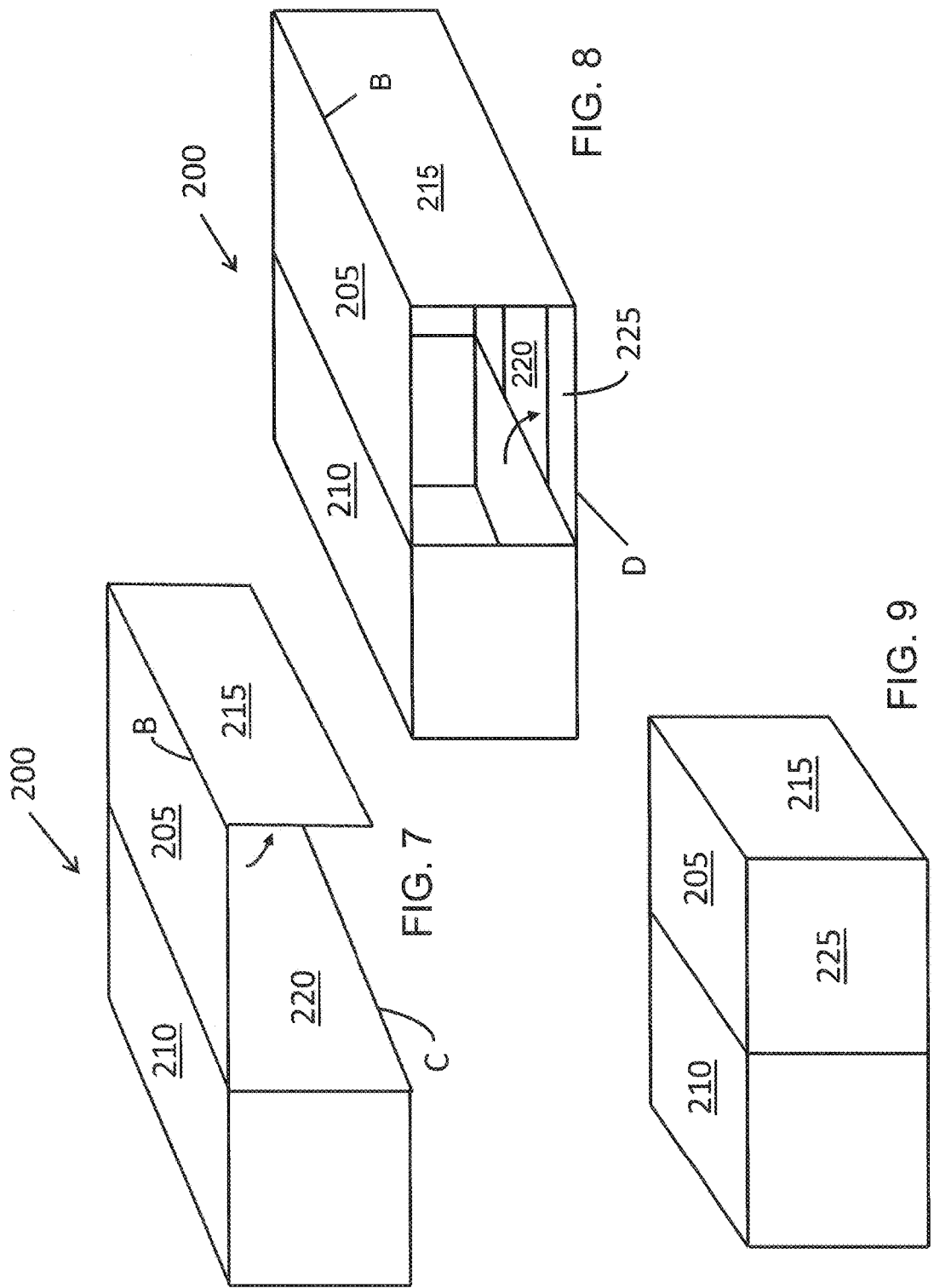

CONTAINER SYSTEM AND METHOD OF USE FOR FARMING

CROSS-REFERENCE TO RELATED APPLICATION

This application is a continuation-in-part of U.S. application Ser. No. 15/152,011 filed May 11, 2016, which claims the benefit of U.S. provisional application No. 62/160,346 filed May 12, 2015, the entire disclosure of each of which is expressly incorporated herein by reference thereto.

BACKGROUND

The present invention relates to a farm from a box system that includes a container for farming and a method of using the system, container and its contents in agricultural activities such as farming. The container is a shipping container or modular unit/container that includes all tools required to assist communities in being able to conduct agricultural activities in order to provide sufficient food for existence, income generation, and other localized food production, e.g., schools, restaurants, correctional facilities, disaster relief, etc., provided in a compact form for shipping to locations where needed. After opened and installed, the container provides a number of critical and important features that facilitate such endeavors either for growing sufficient crops for the end user as well as to provide additional amounts of crops to support a small business enterprise. In particular, the container and its use represent a new social enterprise designed to address hunger and poverty in rural communities globally as well as to provide other micro-farming possibilities.

A number of systems already exist for trying to provide a shippable container that is capable of growing products therein conventionally either in soil containers or in water (see, e.g., ECO-SPHERE http://eco-sphere.com/about.htm-laquaponics). These containers are helpful but quantities of crops or products are limited in type or selection as well as by the size of the container interior which is generally on a relatively small scale. For example, internal hydroponic and aquaponic systems are limited primarily to leafy greens.

Also, slide out containers that are compact for shipping but that can be expanded during installation and use are generally known as discussed in US patent application 2012/0261407. It is also generally known to provide containers that are essentially power stations (U.S. Pat. No. 8,593,102 and application 2014/0116486), or that are designed to provide or generate clean water (see, RED BIRD http://www.cardinalres.com/red-bird/overview). There also exist kiosks or other containers that provide solar power, Wi-Fi, water, and goods for sale (see, e.g., CocaCola's EKOCENTER http://www.coca-colacompany.com/stories/ekocenter-empowering-community-well-being-through-social-enterprise/).

What the prior art fails to provide, however, is an entire ecosystem dedicated to farming on a micro rather than macro level to assist people in generating crops for their own use or for sale to others. This is now provided by the present invention.

SUMMARY OF THE INVENTION

The invention now provides a farm from a box system comprising an expandable shipping unit that includes one or more containers therein, with the unit convertible between a first condensed or closed configuration that includes all system components therein for transport or shipping, to an expanded or opened configuration of larger size to provide access to the system components for use thereof; a regenerative power component for providing power to electrical components of the system; and a plurality of core system components arranged within and attached to a primary container. The core components comprise an electrical subsystem to store and distribute electrical power, which includes a storage battery, lighting and electrical controls; and a water purification and distribution system that includes a pump and filtration system. The regenerative power component is operatively associated with the core components to facilitate operation of the lighting, pump and other core components to allow farming operations to be conducted outside of the farm from a box system.

In this system, the core components are arranged and pre-installed in the primary container in a compact and secure manner to facilitate shipping and initial storage once the unit arrives at its destination. The particular arrangement in a primary container will depend upon the items or components that are to be included, the number of containers in the system and the arrangement of the installed system on location.

Advantageously, the primary container comprises a top, bottom and a wall that includes at least two movable panels, with a first panel hingedly connected to the top of the container to pivot upwardly to form the top of an expanded container section; and with a second panel hingedly connected to the bottom of the container to fold downwardly to form a floor of the expanded container.

The first panel may include a further panel hingedly connected thereto on a side that is opposite to that where the first panel is connected to the top of the container, with the further panel pivotable downwardly form the unfolded first panel to form an outer wall of the expanded container. Also, the second panel may include first and second further panels connected to sides of the second panel that are perpendicular to the hinged connection, such that after the second panel is unfolded, the first and second further panels can be pivoted upwards to form sides of the expanded container section.

In another embodiment, the primary container comprises a top, bottom and a wall that includes at least four movable panels, with a first panel hingedly connected to the bottom of the container to pivot downwardly to form the floor of an expanded container section; and with a second panel hingedly connected to the first panel to pivot upwardly to form a vertical back wall for the expanded container section, with the second panel including two half panels hingedly connected thereto on each side to pivot outwardly to swing into position to forming the side walls of the expanded container.

Alternatively, the at least one container includes a first generally rectangular container having a top, a bottom, two ends, and two sides, with the sides being wider than the ends; a second generally rectangular container configured and dimensioned to fit within the first container for shipment, the second container having a top, a bottom, two ends one closed side and one side; and a movement mechanism positioned between the first and second containers.

Preferably, the solar panel assembly is mounted on the second container. The closed side of the second container forms one of the sides of the first container when positioned inside the first container, and the top of the second container is spaced from the top of the first container to provide sufficient clearance for the retractable solar panel assembly. Also, the second container is the primary container that houses the core components therein and is movable into and out of the first container by the movement mechanism from a first position where the second container is positioned inside the first container for shipment to an extended position where the second container is substantially completely removed from within the first container.

The movement mechanism includes wheels or rollers provided upon the bottom of the second container and first and second tracks or rails associated with the bottom of the first container and located beneath the wheels or rollers of the second container to allow movement of the second container between the first and second positions. Also, the open side of the second container includes a foldable floor section that is pivotably joined to the bottom of the second container so that the floor section can pivot from a first position where it is positioned generally vertically with respect to the bottom of the second container when in the first position to a generally horizontal position in line with the bottom of the second container when the second container is in the second position.

The open side of the second container may also include a wall section that is associated with the top of the second container and extends towards the top of the first container to close the space between the top of the second container and the top of the first container when the second container is in the second position. The second container includes one or more access ports located on the ends or closed side. The access port may be a pull down or sliding door that forms part of the closed side. The access port may also be is a horizontal panel that forms an upper part of the closed side and that pivots upward to form an extended ceiling at the top of the second container to provide complete access into the second container through that side. The first container typically includes one or more access ports located on the ends or sides.

The end of the second container below the closed side and the bottom includes one or more supports for supporting the bottom of the second container when in the second position.

The system may further comprise a third generally rectangular container configured and dimensioned to fit within the first and second containers for shipment, the third container having a top, bottom, two ends, a closed side and an open side, and a movement mechanism positioned between the second and third containers, wherein the closed side of the third container forms the other side of the first container when positioned inside the first and second containers, and the third container is movable into and out of the first and second containers by the movement mechanism from a first position where the third container is positioned inside the first and second containers for shipment to an extended position where the third container is substantially completely removed from within the first and second containers. The movement mechanism may be wheels, rollers, a slidable track or a hinged mechanism associated with the bottom of the second container and upon which the third container is seated to allow movement of the third container between the first and second positions. For this embodiment, the third container is the primary container that houses the core components.

Additionally, one of the containers includes a structure in collapsed form for erection of a greenhouse or shadehouse along a side of the outermost container, the structure including a pop-up, half dome, quarter circle skeleton frame of supports and a covering of netting, shade cloth or greenhouse plastic, wherein the supports and covering are present inside the container for shipment, and then can be withdrawn to erect the structure, with the supports attached to the side of the container, provided with the netting, cloth or plastic and then locked into place upon erection. The materials are initially provided in the innermost container. This convertible shadehouse/greenhouse structure can be used to shelter seedlings grown on top of racked shelves that are extracted from the innermost container and protects those seedlings from adverse weather, excessive sunlight, or insects.

The core components of the system may specifically further comprise LED lighting; a water pump, water filter and drip irrigation system; a battery for powering the pump and lighting; and a charging system operatively associated with the solar panels battery for charging the battery, with these components typically provided in the first container. Preferably, one or more of the containers are electrically wired for supplying power to plug in components, including wi-fe capabilities, sensors, drones, refrigeration systems, hydroponic systems, aquaponic systems, water harvesting and catchment systems, charging stations, electronic control systems or any of the foregoing. Wireless communication devices, tools, agricultural supplies, training information and operation manuals are also included.

In another embodiment, the system may include a shipping unit comprising at least one container, with the unit including all system components therein for transport or shipping and the unit having an opened configuration to provide access to the system components for use thereof. The system may also include a regenerative power component for providing power to electrical components of the system and a plurality of core system components arranged within and attached to a primary container with the components including an electrical sub-system to store and distribute electrical power, which includes a storage battery, lighting and electrical controls and a water purification and distribution system that includes a pump and filtration system. The regenerative power component is operatively associated with the core components to facilitate operation of the lighting, pump and other core components to allow farming operations to be conducted outside of the system from the components provided thereby. The at least one container may include a first generally rectangular container having a top, a bottom, two ends, and two sides, with the sides being wider than the ends. The first container includes lighting, a water pump, a water filter and a drip irrigation system; a battery configured to power the pump and lighting; and a charging system operatively associated with the solar panels configured to charge the battery, while also being electrically wired and configured to supply power to plug in components. These plug in components may include one, more or all of sensors, refrigeration systems, hydroponic systems, aquaponic systems, wi-fi routers, water harvesting and catchment systems, charging stations and electronic or data control systems for remote monitoring and other applications.

In one embodiment, the primary container includes at least two compartments one of which includes a cold storage room and the other of which includes an outer room. The cold storage room preferably comprises an internal cold-storage refrigeration system configured to maintain food products therein. The outer room further comprises wireless communication devices, tools, agricultural supplies, training information and operation manuals, and tools, agricultural supplies, power and irrigation that are necessary to facilitate growth of sustainable crops.

In this embodiment, the system further comprises a second generally rectangular container configured and dimensioned to fit outside the primary container for shipment. Also, if desired, a third container can be provided to receive the first and second containers for shipment. The number of containers generally provide the overall size of the installation.

The invention also provides a method of use of the systems described herein for assisting people in farming activities conducted outside of the containers, with the containers providing the necessary tools, agricultural supplies, power and irrigation to facilitate growth of sustainable crops. Additionally, the system is designed to have three different water access kits: a kit and pumping system for municipal water, ground well water and river or lake water. This enables the system owner to successfully and efficiently conduct organic and small scale farming within a turnkey, pre-installed system. The invention contemplates planting outside of the container to allows the end user to grow a full range of crops, whole food system, from grains and legumes to fruit and root crops in addition to leaf crops, thus providing full customization to whatever the end user would like to grow.

BRIEF DESCRIPTION OF THE DRAWINGS

For the purposes of illustrating the present invention, there is shown in the drawings forms which are presently advantageous and which are directed to preferred embodiments, it being understood however, that the invention is not limited to the precise forms shown by the drawings, in which:

FIG. 1 is a side view in cross-section of a container according to the invention in a collapsed or closed configuration for shipping;

FIG. 2 is a side view also in cross-section of the container of FIG. 1 in an extended configuration;

FIG. 3 is a top view in cross-section of the container of FIG. 2 in an extended position;

FIGS. 5 to 9 illustrate a particular container with foldable, movable panels that allow extension of the shipping container into a much larger expanded structure, with the figures illustrating the unfolding of the panels to form the expanded structure;

FIGS. 12 to 17 illustrate yet another expandable container wherein FIG. 12 illustrates the closed container and FIGS. 13, 14, 15 and 16 illustrate the expanding of the container and FIG. 17 illustrates the final expanded structure;

FIGS. 18 to 20 illustrate an expandable container that forms a third working area wherein FIGS. 18 and 19 illustrate the container after a first expansion while FIG. 20 illustrates the further expanding of the roof of the container to provide a shade awning;

FIGS. 23 and 24 illustrate another expandable container for use in the system of the present invention, whereas FIG. 23 illustrates a partially open structure while FIG. 24 illustrates a fully expanded structure;

DETAILED DESCRIPTION OF THE INVENTION

Figure 4:
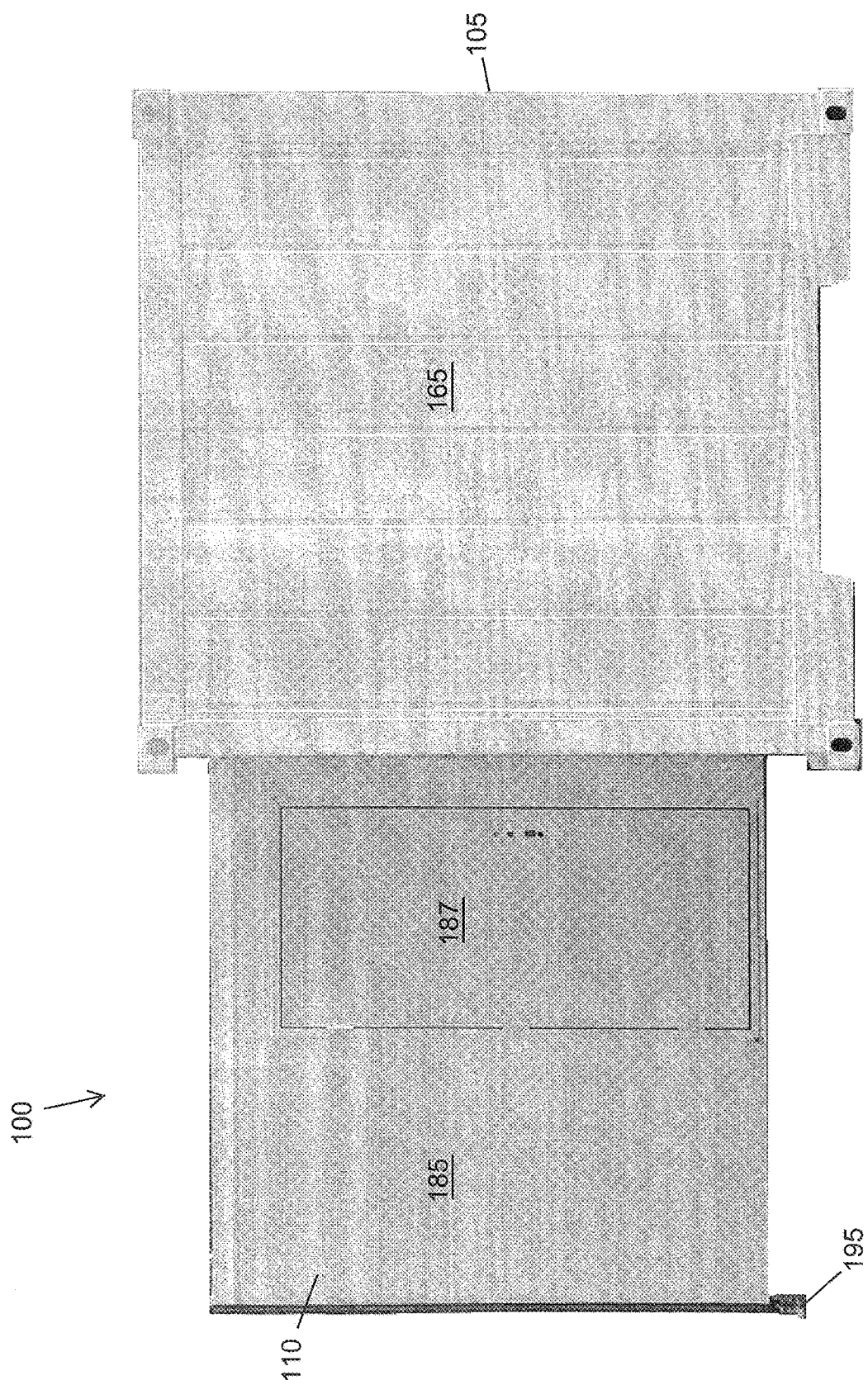
FIG. 4 is a side view of the container of FIG. 2 in an extended position.

The container of the farm from a box system of the present invention includes a number of useful items to assist the owner in growing crops. First of all, power is supplied to the unit primarily through the inclusion of solar panels. These solar panels would be arranged on the roof or top surface of the container so that it will be out-of-the-way and not utilizing any of the ground that would be necessary for growing crops. Fastening the solar panels firmly to the roof also assists with protection from theft. Alternatively, instead of solar panels, a wind turbine or biofuel generator can also be used, as can combinations of these types of renewable power generating equipment.

Power is that is generated by such equipment is stored in a battery storage system which then supplies the necessary electrical power for operating the other components of the system. The battery storage system would be located within the first container so that it would be protected from the elements and from theft. The system is basically designed to be at least 2 KW and preferably 3 KW power system. The power distribution system is generally designed to provide at least about ¾ of the power to be dedicated for pumping water from a source to the field for crops, with the remaining power available for the other items including LED lighting, charging/recharging equipment and electronic communication devices, sensors, filters, and other equipment dedicated to the growth and preservation of crops, seeds and food.

A main component of the system is a subsystem for providing water. This subsystem includes a pump, filtration system, purification system, and a tank for storage of a supply of clean, filtered water. Included with the system are sufficient tubing or piping to carry the water from the pump to the planted seeds or crops. The most efficient use of water distribution is a drip irrigation system, wherein the tubing or piping is provided with a series of small holes such that when installed on the surface or in the ground, water can be provided to the roots of planted crops for nutrient application and fertigation. Closed piping or tubing leading to spraying equipment can also be included. The provision of a water storage tank is useful for holding collected water in order to provide water to the plants during periods when rainfall is insufficient. The containers can also include a water harvesting unit/storage mechanism for this purpose. This also provides a tank for potable water for use by the people in the farming community. If desired, the tank can be used for the purpose of gravity fed irrigation. Generally, the water system would provide, e.g., around 8 to 10,000 gallons per day approximately for a 1 hectare or 2 acre system. For larger areas, additional tanks, pumps or tank or pump capacity can be provided as necessary.

The electrical power system also provides power to an LED lighting system that is already mounted in the containers. LED lights are used for primary lighting within the structure. Additional lighting components can be added later for operation of other components such hydroponics and that element of lighting would have to be dedicated for the intended purposes. Appropriate light switches or controls are also pre-wired and provided inside the containers. In addition to lighting, power outlets for plugging in various types of electrical tools or equipment are provided. Such equipment includes computers Wi-Fi generators, modems, charging stations for cellular telephones, tablets, and components for powering or recharging other electrical components needed for planting or processing crops. The electrical power can also be used to run a refrigerator or refrigeration equipment for storage or preservation of harvested crops.

The containers will also include a variety of agriculturally oriented tools including basic hand tools such as shovels, pitchforks, rakes and the like, as well as other implements needed for farming. Also provided are food drying or food preservation tools as well as storage containers. Seed and other starter crop materials can be provided, typically in bags. These items are not intended to provide continuous sources but instead are simply to allow the owner to begin farming operations. The owner then would need to generate their own seeds, starter plants or fertilizer for future plantings. The operational manuals can explain or describe best growing practices as well as how to conduct composting or other forms of organic fertilization. For example, a compost tea maker or information on one can be provided to help jumpstart the soil along with the supporting tools like a sprayer and or method of integrating into the water system.

Additional components that can be provided in the containers include various sensors, and drones as well as plug-in power renewal components for each. The sensors can transmit information wirelessly to a receiver located in the container, and they can be battery powered with the batteries being rechargeable.

The system includes basic training information and operation manuals. The basic business training will include dedicated software and local buyer relationships. Also for technology use, a computer and SMS technology will be provided to include a pictographic flip-Book manual to illustrate preferred farming techniques. Also included would be governance manuals for training the use of cellular phones, charging/recharging equipment and the electrical switches present in the electrical system.

The overall size of the container is approximately 8'×8'×20' or 40' in length. The system can include two or three total containers therein with either one or two containers being withdrawn from within the largest container to be extended to form the basic agricultural structure. If desired, the container can include smaller structures therein (e.g., a 10' kiosk or shadehouse) or materials for constructing the same that can be used for a small garden and/or temporary housing. The container can also include building materials for an exterior greenhouse that is a separate standing structure or more efficiently, one that is attached to one of the containers. In addition to the greenhouse, a shade house, seeding house, raking system and even seedling trays are all components that can be provided by the present invention. Multiple systems can be joined together or attached to each other in certain configurations for larger scale operations.

The system of the present invention includes one or more containers for shipping and housing the components that are necessary for a farm from a box operation. In one embodiment as shown in FIGS. 1-4, two containers are utilized with the internal container housing the core components and the external container providing an outer structure around the inner container during shipping. Upon installation at the user's location, the inner container is extracted from the outer container typically by sliding along the rollers or wheels, and is installed in position to be ready for use.

Another arrangement is shown in FIGS. 5-9 wherein the outer structures are provided by panels that are folded against the inner container. Again, the inner container houses all of the core components while the panels can be folded away from the inner container to form additional workspaces or rooms that can be used as described herein.

Figure 10:
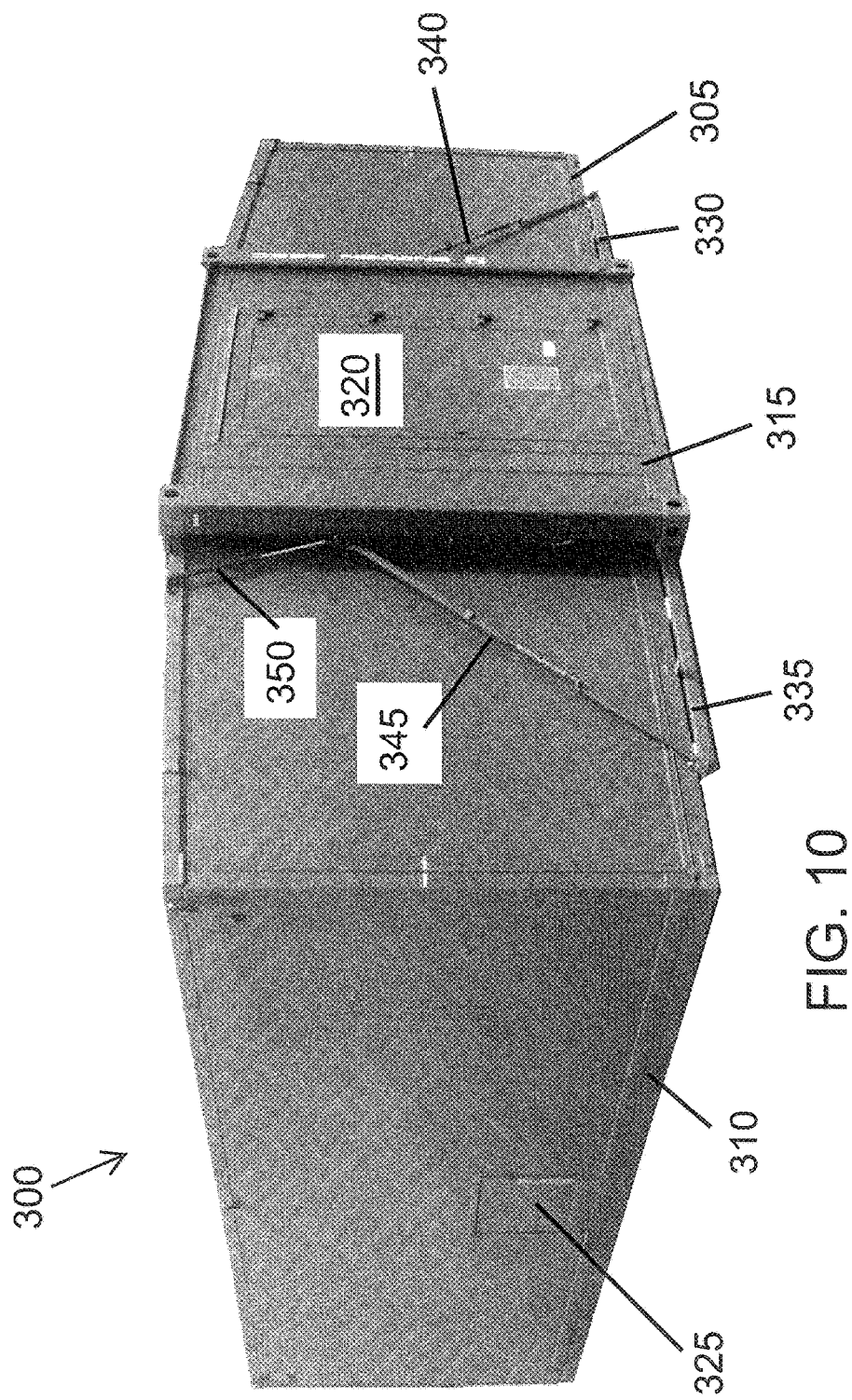
FIG. 10 illustrates a three container embodiment of the invention.

Alternatively, a three in one container arrangement can be used as shown in FIG. 10. Again, the innermost container would house the core components and includes an access door to enter into the structure both before and after installation. The innermost container is removed from the outermost container along one side while the intermediate container is withdrawn from the outer container from the opposite side of the outer container. Typically one side of the inner container and one side of the intermediate container for him the two sides of the outer container for shipping. After installation, the inner and intermediate containers flank each side of the outer container and provide a large relatively large interior for various uses. In some embodiments, the inner or intermediate container could be used as a greenhouse, and for those embodiments, the container would have clear or translucent areas that would allow sunlight to enter into the compartment when erected for use.

Figure 11:
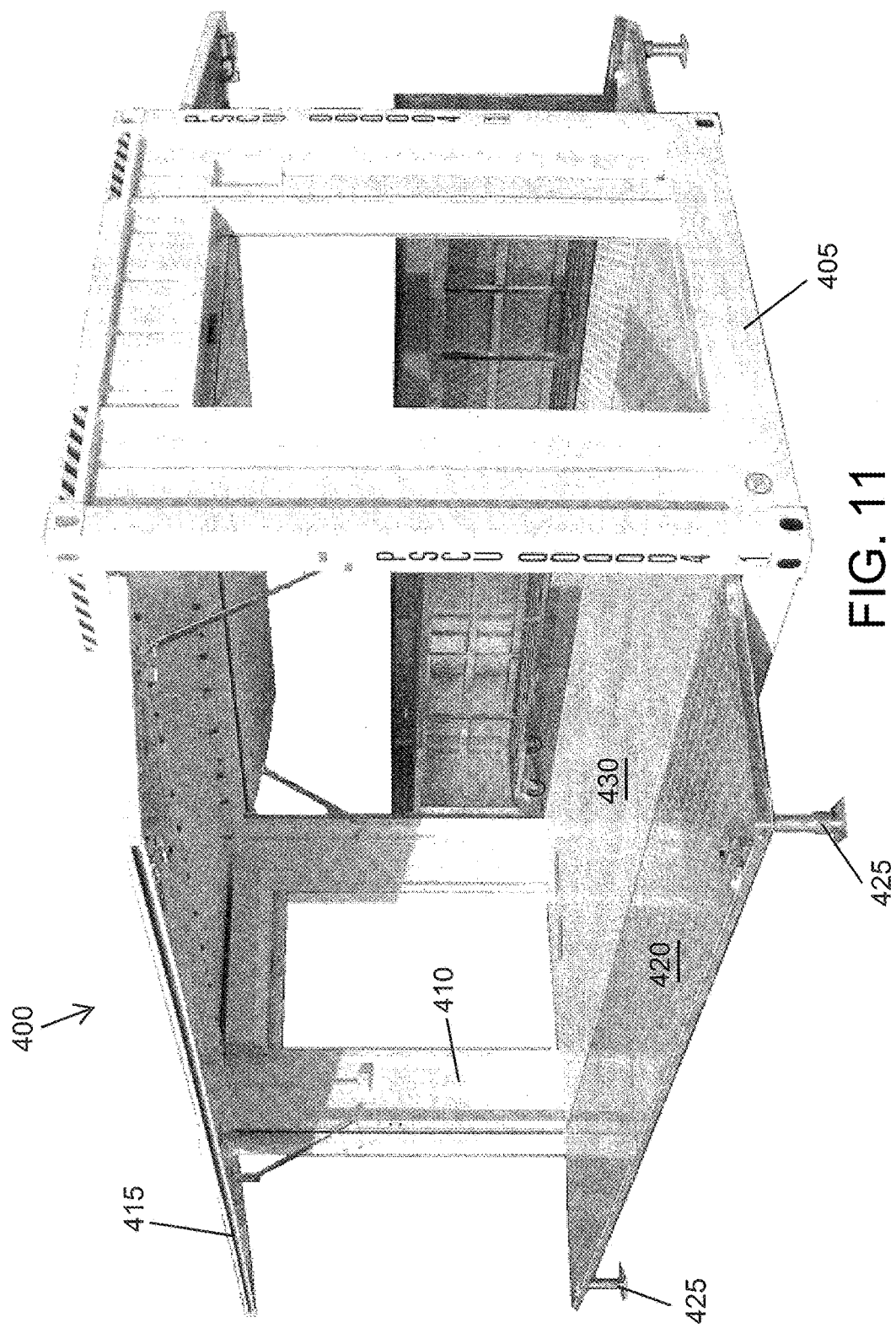
FIG. 11 illustrates a single container embodiment of the invention.

Yet another embodiment is shown in FIG. 11, which illustrates a single container having right and left sides that are divided by half panels. The container has not yet been provided with the internal systems devices, elements or components that are needed to complete the overall system so that the container features can be shown. These half panels extend along the length of the container and one opens upwardly to form an expanded ceiling while the other opens downwardly to form an expanded floor. This expands the open area of the container to approximately double the size that is available when the sidewalls are solid. Also, the open areas can be used for a variety of purposes including as a greenhouse, workspace or other area that allows access to the interior of the container to use or obtain the components mounted therein. For example, access doors can be provided on one or each end of the unit to permit access therein before the side half panels are opened.

Figure 13:
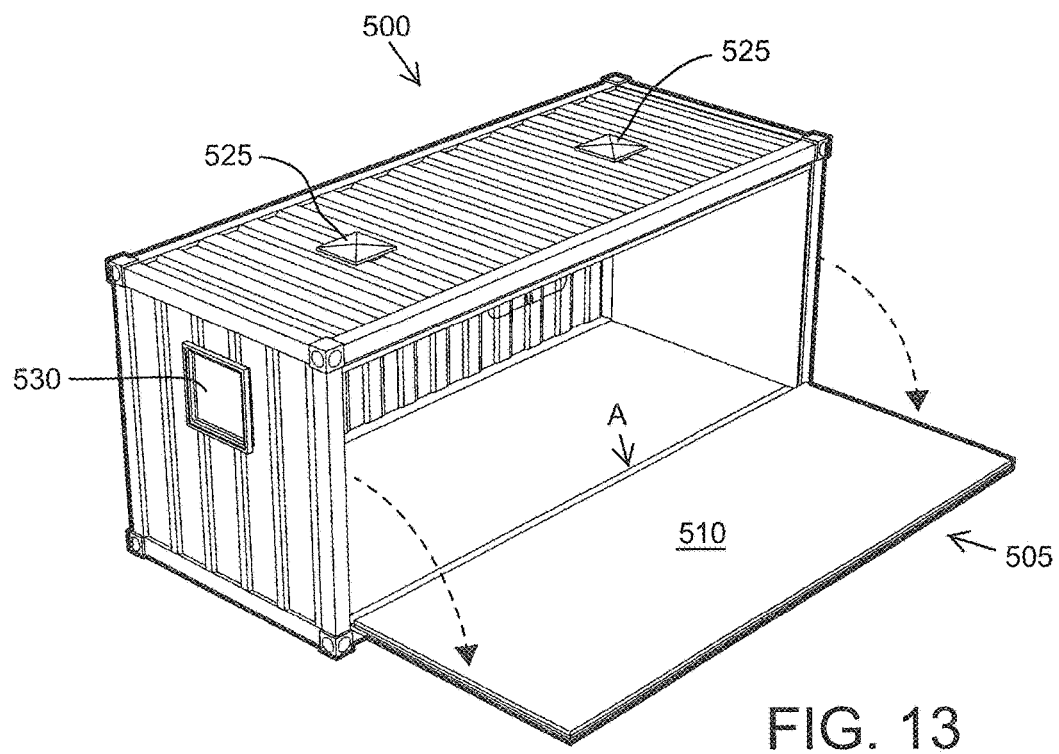

A typical installed system is illustrated in FIG. 13.

A further system is illustrates in FIGS. 16 to 21.

As noted, the innermost container in each embodiment will house the core components of the system. These core components will be arranged in the following order.

In the box, on the right half of the back wall, a panel approximately 4'×4' and 12" deep is provided, which will be dedicated to the power grid for the micro-farm. Two separate subsystems are included in this panel, one to support the water pumping component and one to support the other ancillary power needs, i.e., LED lights, computer/lap top/tablet, wi-fi modem, multiple switches, filtration, devices for crop water and potable water, sensors, drones, cameras, water tanks, water meters, refrigeration units, heaters, and ventilation fans to cool the battery and to dry food. Additional elements are sensors for collecting data, which will be affixed to the items in the unit that apply to powering all electrical devices, monitoring outputs and measuring external elements. Also, appropriate software is included for controlling or operating the various elements or equipment, especially for those that need to cooperate or interact with other equipment. The software preferably includes a living atlas technology that provides real-time mapping solutions to visualize and easily process human and artificial intelligence. The software tests and maps remote infrastructure units to monitor sensor and hardware information. The software provides an easily digestible platform through which the system can catalog, collaborate, and keep tabs on data generated from embedded technologies.

The elements that will be in the electrical panel are a Grundfos Interface box, which connects to the Grundfos Control Unit for the pump side of the complex. Other suitable equipment can be used if desired or if available. The right side of the panel will include, in no particular order a Breaker box, Inverter, Charge Controller and all of the supporting wiring and cables needed to bring the energy from the solar panels to the battery and ultimately to the switches where the power is delivered.

To prevent unauthorized access, the panel will have a lock and be located above the battery so that both components will be locked together. Immediately above the electrical panel will be a recessed control box, which will be used for any switches or cables that will be attached from the exterior of the unit.

The foregoing panel is referred to as a power wall. In addition to the power wall, a recessed cabinet is provided for supplying power to other electrical items. The cabinet is pre-wired to the power wall and includes a number of power outlets to which electrical elements can be attached. Typically, this would include plug in outlets for electricity, pumps, temporary lighting, or just simple switches for plug in items.

The left portion of the unit will also have a cabinet that can be locked from ceiling to floor 6 feet wide and 12 inches deep where various tools, supply kits and replacement parts are stored for shipping and after installation are placed therein when not in use. This area is fully stocked with a complete list of tools that are necessary for conducting farming operations. These tools include those that are noted herein but they may vary depending upon the specific needs or intended use of the system. For example, larger tracts of lands that require the labor of several individuals will often result in the provision of duplicate or triplicate tools so that the farming operations can be conducted without delay or idle time on behalf of the workers.

The innermost unit will also include a 50-gallon water storage barrel with a reverse osmosis system for filtration of potable water. The dimensions of a typical unit are 4 ft 9 by 3 ft 9 in and 18 in high. While reverse osmosis is preferred it is not required as other systems can be used with the same results. Such reverse osmosis units and other equivalent units for this purpose are commercially available from various manufacturers.

The system will include at least 6 to 12 solar panels depending on the conditions of any given location. Each panel is 77 inches long×39.1 inches wide by 1.6 inches thick. Each panel will have the appropriate packaging that will protect the panels in transit. Support racking will include rails, roof mounts, thermal expansion joints, clamps and support wiring. As noted herein, in certain embodiments, the solar panels are mounted upon the inner unit in a way that protects them from damage during shipping and which also allows them to be unfolded or expanded after the innermost container is withdrawn from the outer container.

Each system also includes an irrigation system comprised of several thicknesses of drip tape and lead lines. The tape is in rolls and will be loaded into the box within barrels that is to be used for earth and irrigating needs. The innermost unit will also typically provide 250 feet of cable & 250 feet of flexible piping for the pump in coils that will be stacked on the floor with the submersible pump for shipping. Different amounts may be utilized in special situations where larger areas are to be farmed. During installation, these materials can be easily removed and installed in the field for use.

The system will also provide additional useful items for the owner. A tool box that is typically about 3 feet wide by 4 feet in length and 3 feet deep will house all the sensors, computer equipment, modem, antenna and support cables, and software and support manuals and documentation. This box will be provided in another location of the innermost container for securing items that are of value. The box will be tethered by D-rings and clamps welded to the wall to prevent unauthorized or inadvertent removal.

The innermost unit will also include rolls of shade netting stacked in the box and all of the PVC support pipe will be deconstructed and tied up in bundles which will also be neatly stacked and secured for shipping and transit. Seed trays will be provided in boxes that are with other equipment such as a wheelbarrow packaged in a box with the boxes wedged together to avoid unintended movement during shipping and transport. Also, the interior of the box will have several D-rings welded into the walls, primarily for the use of tethering cargo securely for shipping and transit.

Additional materials, such as tanks, piping and filtration systems for creating aquaponic subsystems can be included. The system may also include items for development of the soil or ground, including compost materials or structures, effective microorganism systems, mulching systems, and vermiculite systems. Also, structural materials for providing, e.g., a beehive or a shelter for livestock may be provided depending upon the size of the modular unit and the needs of the party to whom it will be delivered.

Materials for constructing a greenhouse or shadehouse can also be included if desired. The tubing supports for the greenhouse/shadehouse will fit into and be attached to openings in the container to securely hold the supports while also providing on side of the attached structure. Appropriate quantities of screening or shade cloth is provided and are is cut to the appropriate lengths and widths to fit onto the supports so that the structure can be erected quickly and easily.

Accordingly, the invention provides a self-contained farming system with all essential and necessary components to allow the user to begin farming operations quickly and efficiently.

Turing now to the drawing figures, FIGS. 1-4 provide a side view of one embodiment of the invention wherein the containers are arranged for storage. For simplicity, certain internal components have been removed to illustrate the basic configuration of the containers.

FIG. 1 is a side cross-sectional view of the container system 100 of the present invention. Container system 100 includes an outer container 105 and an inner container 110. The top 115 and back side 120 of the outer container 105 forms the outer top wall and outer back wall respectively of the container system 100. The back wall 125 of the inner container forms a portion of the opposite side of the container system 100. The top wall 130 of the inner container 110 supports a folded or collapsed arrangement of solar cells 135. As shown, when the containers are in a closed, shipping state, the solar cells are located in close proximity to the top wall 130 of the inner container which is located within the outer container 105 so that the solar cells are protected from damage during shipping.

FIG. 1 illustrates the solar cells or panels 135 in a folded configuration, while FIG. 2 illustrates them in an unfolded and operable position. The hinging adaptation of the panels allows the solar panels to be pre-attached to the top wall 130 of the inner container 110 and then simply being unfolded or raised into the desired operational position after the inner container is extended outwardly from the outer container 105. The panels are unfolded by being raised upon supports which places the solar cells in the appropriate position. The supports can be manually extendable telescopic rods or pneumatic piston/cylinder arrangements for larger installations. The solar cells or panels 135 are unfolded and raised while remaining attached to the top wall 130 of the inner container 110 by appropriate hardware and roof connections.

As the top wall 130 of inner container 110 is positioned sufficiently below the top wall 115 of outer container 105, there is a small space that would otherwise be open during shipping. Instead, inner container 110 includes a small wall portion 140 that extends from the top wall 130 of the inner container to the bottom of the top wall 115 of the outer container to seal off the area where the folded solar cells 135 are located. The opposite side of the top wall 130 of the inner container has a similar structure 145 which seals off the outer container when the inner container is in the extended position as shown in FIG. 2.

The outer container 105 also includes a floor structure 150 that includes a track and roller arrangement for movement of the inner container of 110. To move the inner container 110 to the extended position, the rollers 155 that are attached to the bottom of the inner container 110 roll along track 160. Two tracks are provided for ease of movement of the inner container.

FIG. 3 also illustrates the inner container 110 in the expanded position. The tracks 160 are shown within the outer container 105, which includes outer back wall 120 and outer side walls 165, 170. As shown, the inner container 110 includes a central wall 175 that forms a closed area or compartment 183 for storage of certain system components. The remainder of the inner container 110 forms a room 188 includes a pull down door 180 that provides entrance into the container. The inner container 110 includes outer wall 125 and sidewalls 185, 190.

The internal storage compartment 183 can be used as an electrical/power room that houses the battery, electronic controls, pump and other more critical or important components. The storage compartment 183 can be secured so that access therein is limited to protect against theft of or vandalism to those components.

FIG. 4 shows a side view of a 40' container system 100 with the inner container 110 in an extended position. Also shown is a possible door 187 to provide access to the closed compartment 183. This may be provided on that side of the container although it also can be elsewhere. Other types of doors can be used instead. Also illustrated in FIG. 4 is the support 195 that is used to hold the cantilevered end of the inner container in the appropriate position above the ground.

The inner container can be withdrawn from the outer container by workers alone or with the assistance of a winch, depending upon the weight of the components in the container and the specific movement mechanism. Handles are provided either for grasping by workers or for allowing connection to a hook attached to the winch cable.

FIGS. 5 through 9 illustrate another embodiment of the present invention. FIG. 5 shows a shipping container 200 of the present invention in a collapsed or closed position ready for shipping. Container 200 has a foldable wall 205 that can open to provide access to the container interior. Foldable wall 205 includes three movable panels. The first movable panel forming wall 205 is hinged at the top of the container such that it along with the second movable panel can be pivoted along hinge A upwardly as shown in FIG. 6. Once the first two movable panels are pivoted to be parallel to the top 210 of container 200, the inner panel 215 can be moved into position. Inner panel 215 is pivotable along hinge B as shown in FIGS. 6 and 7 and can be moved outwardly to form an outer wall of the expanded container.

The third movable panel 220 is hingedly attached to the floor of container 200 along hinge C. This panel 220 can be moved downwardly as shown in FIG. 8 to form the floor of the expanded container. In a preferred embodiment, panel 220 also has two internal panels which in FIG. 8 are shown as the top surface of the floor of the expanded container. These internal panels are hingedly connected to panel 220 at its forward and rear ends at a hinge with forward panel 225 and forward hinge D shown in FIG. 8. The second internal panel would be attached to the opposite end (not shown) of the panel 220. These internal panels can be moved upwardly along their respective hinges to form outer walls which close off the expanded portion of the expanded container. The final arrangement of the expanded container is shown in FIG. 9.

The construction of the hinges is not critical provided that the can withstand the weight of the panels and can allow the panels to easily move into the collapsed configuration for shipping and the expanded configuration for use. Conventional hinges that are either continuous along the entire length of the panel or a plurality of conventional individual hinges can be provided spaced along the length of the panel. The hinges would be selected based on the weight that they need to support and the material of the panels.

Additionally, the internal core of container 200 remains open and not affected by the movement of the panels 205, 215, 220 such that the additional components of the invention can be mounted inside the primary container as desired before the container is closed and shipped.

With this construction, the expanded container provides approximately double the space of the original container, as shown in FIG. 9. In a preferred arrangement, panels 205 and 215 and the internal panels of panel 220 are made of clear acrylic or Plexiglas so that the expanded portion of the container can allow light to enter to function as a greenhouse for initiating planting of seeds or seedlings before transferring these to the nearly soil. Also, various types of doors or other openings (e.g., windows or vents for air circulation) can be provided in the panels or sides of the shipping container as desired. The door can be a conventional door as shown in FIG. 4 or a pull down door as shown in FIG. 3. Also, sliding or swing doors can be used if desired. The doors can include conventional locking mechanisms to prevent unauthorized access to the container if desired. The vents are typically provided in the sides or top of the containers to allow air flow therethrough. A reversible fan or other bidirectional air moving device can be associated with the vent to either bring in cool or warm air from outside the container or to expel how air from inside of the container as necessary. This enables the user to control the temperature inside of the unit to a moderate range to facilitate growing conditions therein.

FIG. 10 shows a three container system 300 with the innermost 305 and intermediate 310 containers extracted from the outer container 315 to form two additional rooms adjacent the outer container 315 which subsequently forms a central area of the system. The innermost container 305 would contain the core components and would when installed form one of the outer compartments of the system. Container 315 includes an access door 320 for entry into the structure. In the embodiment shown, all other walls are solid but it is possible to provide windows, access doors or air vents to any of the walls of the containers. Storage areas can be provided with an exterior access panel 325 as shown. Sliding mechanisms 330, 335 allow movement of the innermost 305 and intermediate 310 containers when extracting those containers from the outermost container 315. Also, appropriate mechanical supports 340, 345 350 are provided to assist in maintaining the innermost 305 and intermediate 310 containers in position. It is envisioned, however, that the innermost 305 and intermediate 310 containers can be properly supported by the ground so that these supports are primarily needed for the extraction of the innermost 305 and intermediate 310 containers from the outer container 315.

FIG. 11 illustrates a single container 400 which has expandable panels on each side as noted herein. The container at this stage of manufacture is incomplete because the front 405 and back 410 sides that are shown with openings would be provided with doors prior to shipping. Similarly, the internal components have not yet been added to show the basic configuration of the container in an open position. The side panels include a ceiling panel 415 that folds upwards and a floor panel 420 that folds downwardly to form a floor extension. Note that the folding floor extensions include post members 425 for contact with the ground to maintain the folded floor panels level with the floor 430 of the container. The ceiling panels are slightly sloped to allow rainfall to drain from the roof and those panels. The opposite side of the container includes the same ceiling and floor panels and supports. This particular unit is of smaller size having a length of only 20 feet and the system components, devices and elements would be arranged and stored therein for transport and shipping. Certain movable shelves are illustrated after being moved from inside the container onto the rear floor panel. These are secured in the container with the other components and devices prior to shipment.

Figure 12:
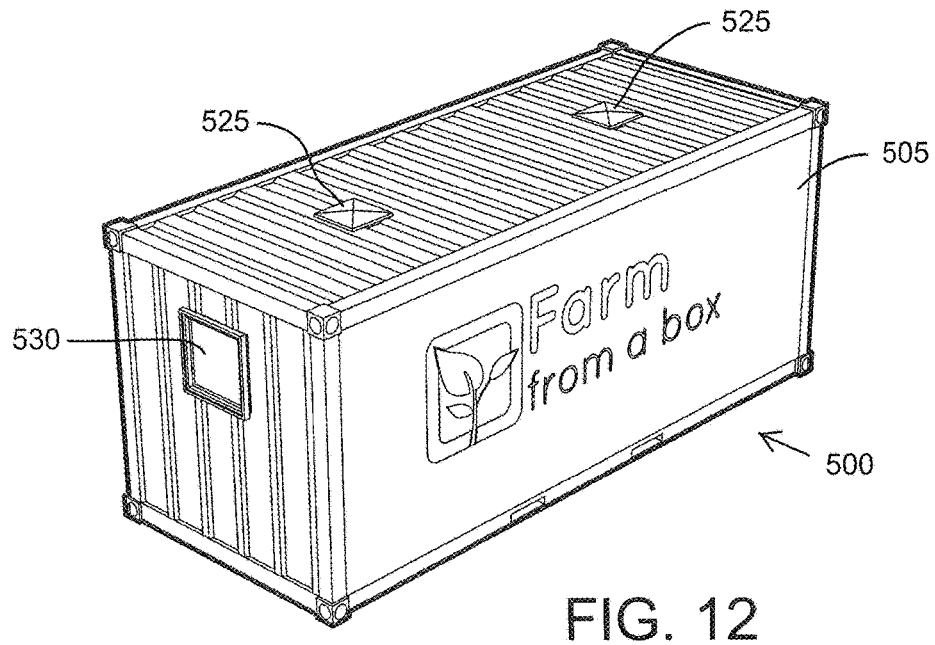
Figure 14:
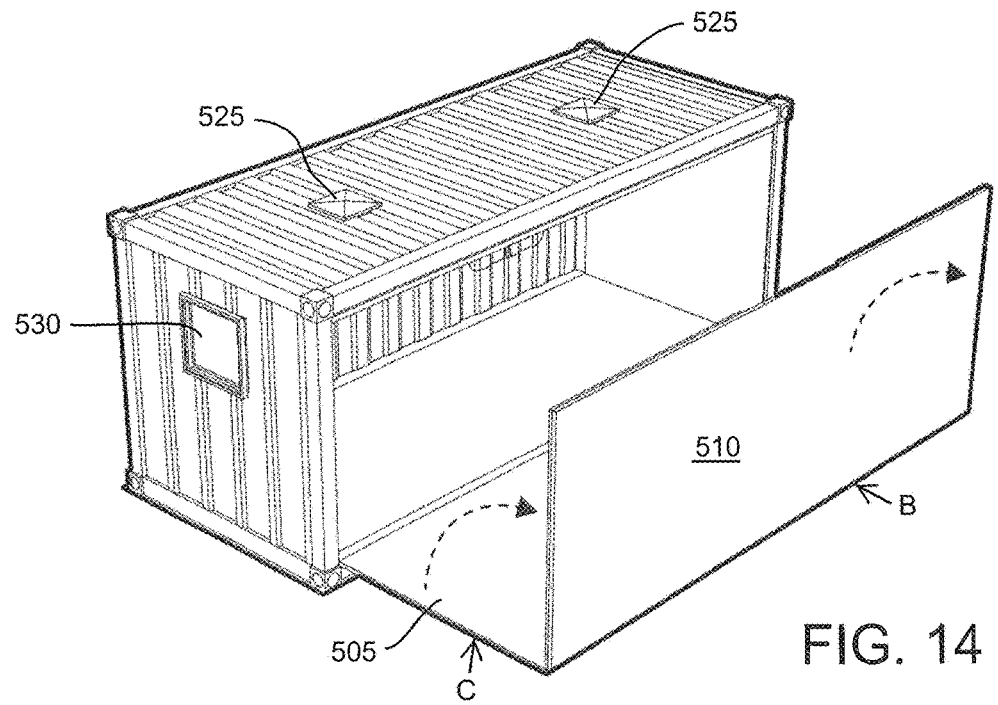

FIGS. 12 through 17 illustrate yet another embodiment of the present invention. FIG. 12 shows a shipping container 500 of the present invention in a collapsed or closed position ready for shipping. Container 500 has a foldable wall 505 that can be opened by pivoting downwardly as shown in FIG. 13 to provide access to the container interior. Foldable wall 505 includes three movable panels. The first movable panel forming wall 505 is hinged at the bottom of the container such that it along with movable panel 510 can be pivoted along hinge A downwardly as shown in FIG. 13. Once the first two movable panels 505, 510 are pivoted to be parallel to the floor of container 500, the inner panel 510 can be moved into position. Inner panel 510 is pivotable along hinge B as shown in FIG. 14 and can be moved upwardly to form an outer wall of the expanded container.

Figure 15:
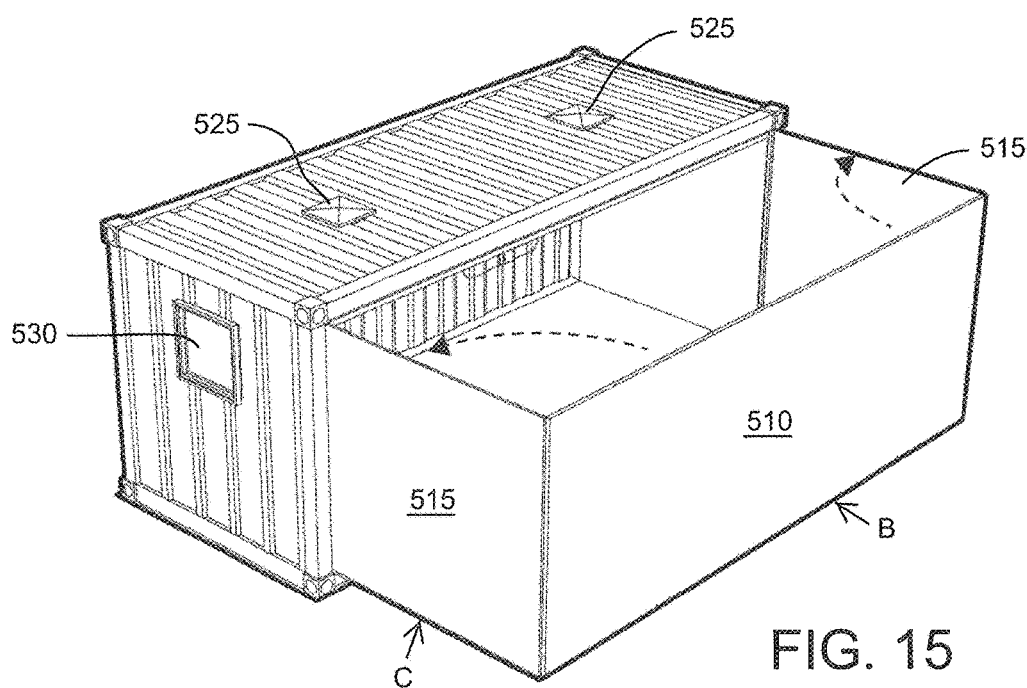
Figure 16:
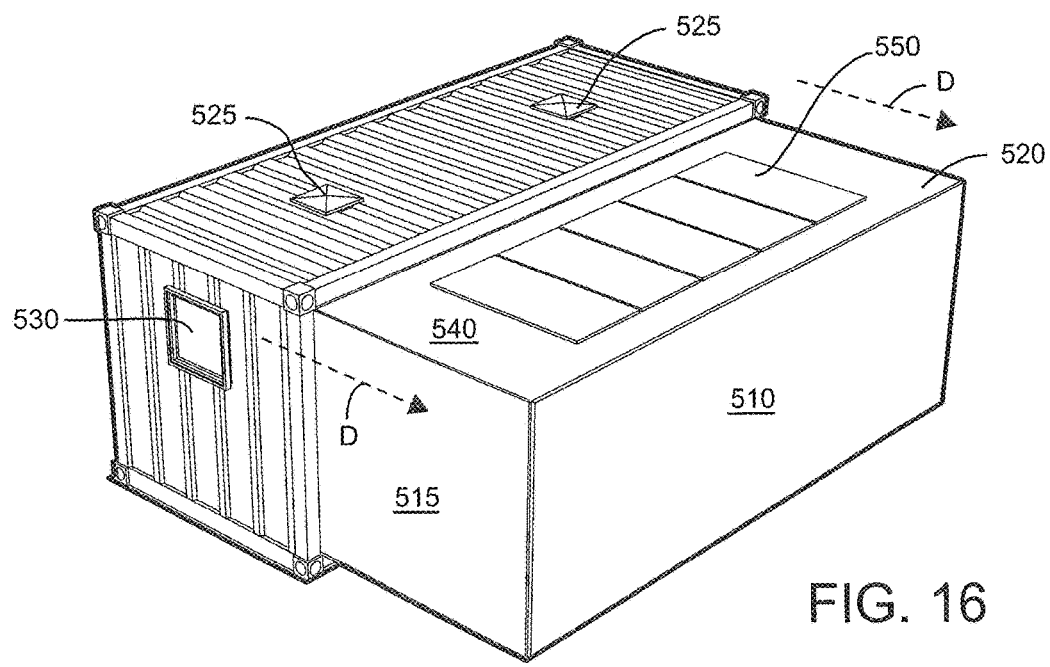

The third movable panels 515 are hingedly attached to the inside of panel 505 along hinge C. These two panels 515 can be moved upwardly as shown in FIG. 15 to form the side of the expanded container. These internal panels can be moved upwardly along their respective hinges C to form outer walls which close off the expanded portion of the expanded container.

Next, panel 540 which supports the solar panels 550 is withdrawn from the container along a sliding track in the direction of arrows D. Panel 540 is pulled out and then is connected to the top of panel 510 to complete the enclosure of the expanded structure. The solar panels are then pivoted upward and into position. The final arrangement of the expanded container is shown in FIG. 17.

Additionally, the internal core of container 500 remains open and not affected by the movement of the panels 505, 510, 515, and 540 such that the additional components of the invention can be mounted inside the primary container as desired before the container is closed and shipped.

Figure 17:
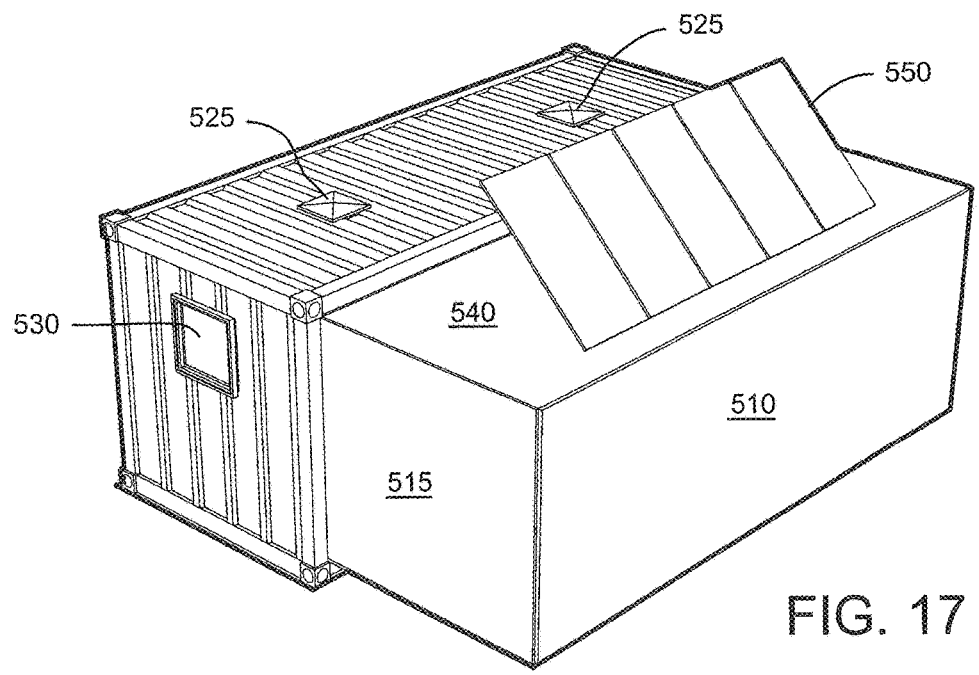

With this construction, the expanded container also provides approximately double the space of the original container, as shown in FIG. 17. The container 500 can also include skylights 425 and one or more windows 430 to provide additional light into the container interior after the structure is expanded and put into use. In a preferred arrangement, panels 515 and the internal panels 525 of panel 520 may be made of clear acrylic or Plexiglas so that the expanded portion of the container can allow light to enter to function as a greenhouse for initiating planting of seeds or seedlings before transferring these to the nearly soil. In addition or alternatively, various types of doors or other openings (e.g., windows or vents for air circulation) can be provided in the panels or sides of the shipping container as desired, and as described for the other embodiments of the invention.

Figure 18:
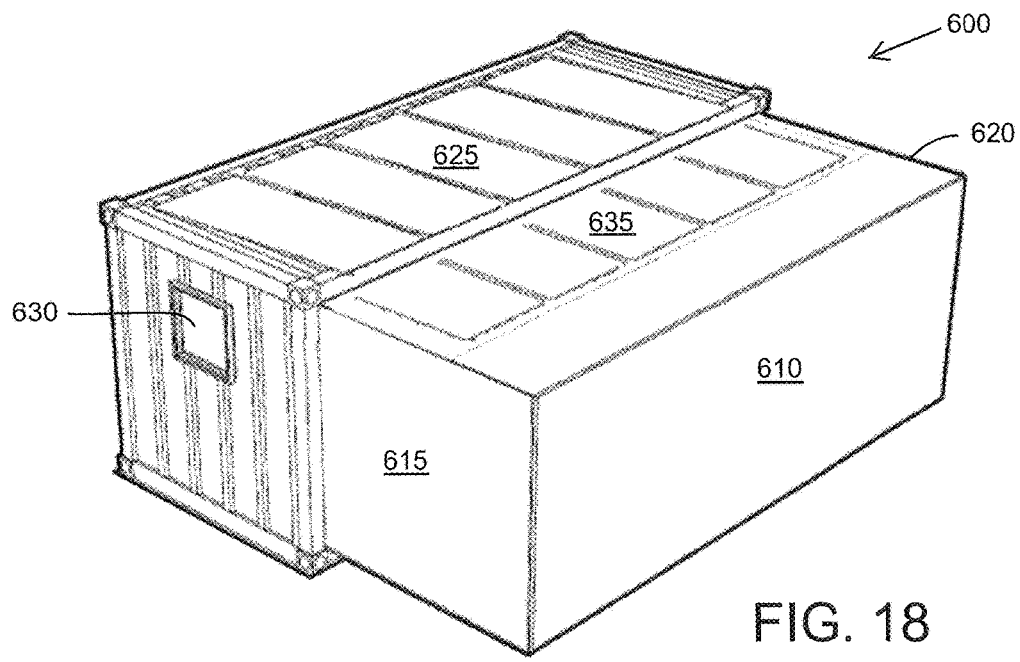
Figure 19:
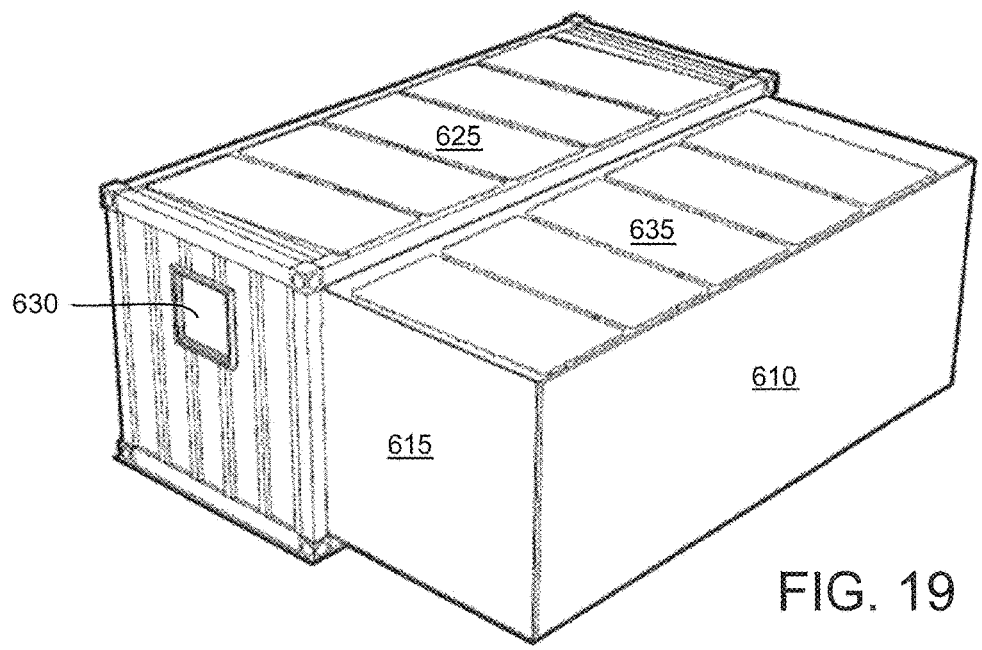
Figure 20:
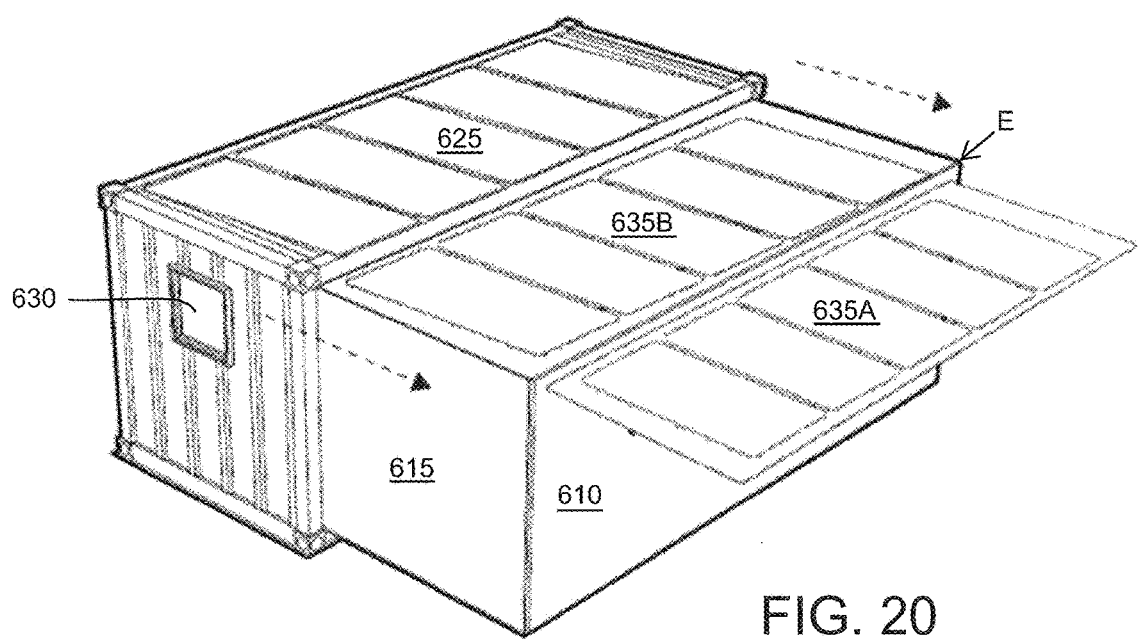

FIGS. 18 to 20 illustrate another embodiment of the present invention where the container is expanded to form three working areas. The container is initially expanded as in FIGS. 12 to 15 to form two working spaces: one present inside the initial container and another in the expanded section adjacent to it. FIGS. 18 and 19 show that the container 600 of this embodiment has a foldable wall that includes three movable panels 610, 615 and 620. The first movable panel forming wall 610 is hinged at the bottom of the container such that it along with movable side panels 615 and 620 that form outer side walls of the second working space of the expanded container. The roof of the container has a roof panel 625. FIG. 18 shows that a further roof panel 635 can be withdrawn from the container along a sliding track toward panel 610. Panel 635 is then connected to the top of panel 610 to complete the roof enclosure of the expanded structure. Preferably, the roof panels 625, 635 are made of a polyfiber material or lightweight metal such as aluminum, and include solar cells that are oriented flat on the roof or that can be raised to be angled towards the sun.

Additionally, the internal core of container 600 remains open and not affected by the movement of the panels 610, 615, 620 and 625 such that the additional components of the invention can be mounted inside the primary container as desired before the container is closed and shipped. As in the embodiment of FIGS. 12 to 15, one or more windows 630 can be provided to allow light to enter into the primary container that houses the first work space.

A further alternative is illustrated in FIG. 20, where panel 635 includes an outer panel 635A that is hingedly attached to an inner panel 635B at hinge E. The outer panel 635A is pivoted over 180 degrees from where it was provided initially lying flat against inner panel 635B for shipping to be unfolded to extend away from panels 635 A and 610 to form an extension of the roof. Outer panel 635A can be held in position by poles which are provided with other equipment in the container interior and which are installed to be connected to the container wall or to be simply dug into a hole in the ground at each corner of the panel 635A. Thus, panel 635A forms a roof of the structure above a third working space. This roof also acts as a sun shade or awning to allow the farm personnel to work under less sun heat.

For optimum power, panels 625, 635A and 635B are provided with solar cells so that they can collect energy for the system. This arrangement effectively doubles the power that can be collected compared to other embodiments while also providing shade as well. The solar cells can be any of those that are commercially available with the higher power, light weight systems being preferred. Making these panels of lightweight materials as in the embodiment of FIGS. 12-15 is desirable.

Figure 21:
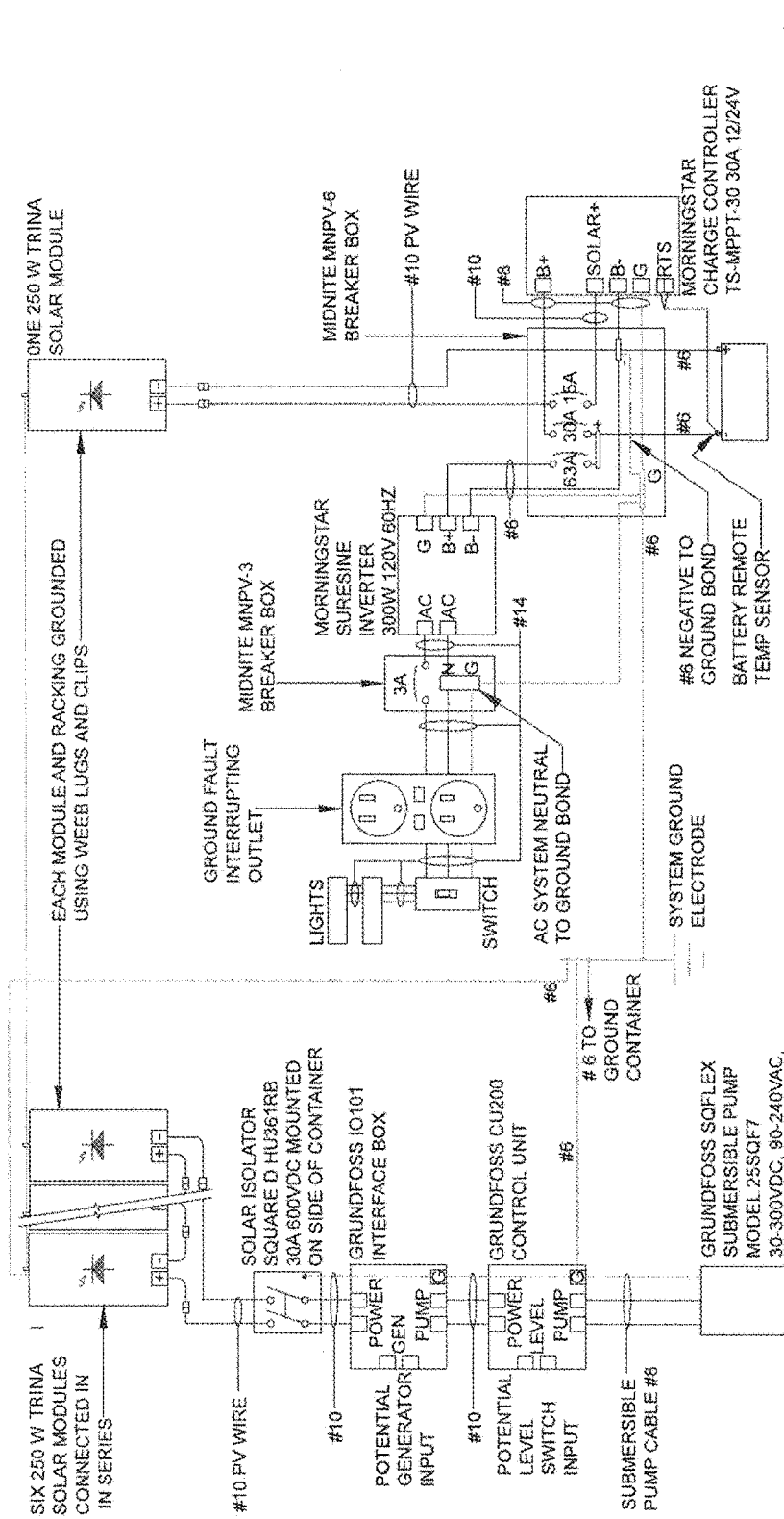
FIG. 21 is an electrical line drawing for the power components of the invention.

With this construction, the expanded container also provides approximately triple the space of the original container, as shown in FIG. 21.

As shown in FIGS. 12 to 21, the container is designed to include window or skylights to provide additional light into the container interior after the structure is expanded and put into use. Of course, a skilled artisan can determine the size and number of doors, windows and skylights for the structure depending upon the use of the interior space. And as noted herein, interior lighting can also be provided.

As can be seen in the different arrangements shown herein, one of the containers houses the core components of the system, and this is referred to as the primary container while the second container that moves out of the primary container is referred to as the pull out container. It is advantageous for the pull out container to be made of composite materials which are of lighter weight than steel although providing good strength. These materials include engineering plastics as well as reinforced plastics. For example, a composite fiberglass reinforced thermosetting resin sheet would typically have a thickness between about 4 to about 10 mm. This reduces the weight of the overall container to facilitate shipping and installation. As at least of the panels form outer walls of the expanded structure, they should be protected from exposure to UV or sunlight that could over time could cause a degradation of properties. For this, the panels can be provided with exterior coatings of more resistant materials, or the panels can be made from resins or other plastic materials that are formulated with additives that provided the necessary resistance to light or UV exposure.

The most preferred core components of the system include a regenerative power component or components; water purification and irrigation system that includes a water pump and filtration system; and an electrical control system to store and distribute electrical power. The following is a further description of those components.

To provide off-grid power, the system includes a solar panel arrangement. Preferably, ten (10) high density 72 cell 300 W solar panels are mounted to the roof of the pull out container and/or the roof of the main container. These panels will be fastened using, e.g., a Schletter R2000 rails system that will interface with the electrical system that is preinstalled on the interior of the primary container.

Alternatively or additionally, a wind turbine and mast can be attached to the exterior of the container by a locking mechanism to prevent theft with the appropriate electrical connections for either regenerative energy supply relayed into the internal battery bank for energy storage.

The inner core of the containers of the invention can contain a number of additional system components that are provided and mounted therein A first storage area is provided. This is a secure area that represents an electrical closet of the container, requiring approximately 18-24" inches in depth and extending from ceiling to floor of the container. This area will house the following exemplary items that provide the electrical power to the unit and other components therein:

(a) Solar Isolator Square D HU361RB (30 A 600 VDC mounted);
(b) Grundfos IO Interface Box;
(c) 3000-watt PV power generator—10 units in two series for establishing both a micro grid within the unit and a power supply specifically for the water pump mechanism;
(d) Grundfos CU Control Unit;
(e) Ground Fault Interrupting Outlet;
(f) Midnight MNPV-3 Breaker Box;
(g) two Morningstar Suresine Inverter 300 W 120 V 60 HZ;
(h) Morningstar Charge Controller TS-MPPT 30 30 A 12/24V; and
(i) All necessary cables and wires of appropriate length for the micro grid.

The container will include LED Lights, at least one of which will be located in the secure area and another of which is provided in the modular unit. Another light can be provided in the additional container or the extendable container or structure. These will be controlled by three light switches in the interior and one outside of the unit to accommodate power needs on the exterior of the container. All of these would be pre-wired and installed before the container is shipped, although additional capabilities can be provided for installation once the unit is expanded.

A line drawing illustrating the electrical connections for the unit is provided in FIG. 21. The container will include or carry appropriate electrical power outlets that are either recessed into the container or provided in a recessed area in the container. AC power plugs and sockets are provided to allow electrically operated equipment to be connected to the primary power supply. These electrical plugs and sockets will differ in voltage and current rating, shape, size and type of connectors depending upon the specific country where the system is to be used. This will allow the pump and other electrical devices to be easily connected to the power source.

Power generated by the solar panels or wind turbine will be stored in a Trojan L16-AGM 12 volt battery which will also be secured to and safely stored in the container. The battery will typically store energy for powering the off grid components not inclusive of the water pump. A battery remote sensor negative to ground bond will also be provided.

The water providing components can include a water portable device that is designed to process polluted water into clean drinking water. Components for such a system generally comprise a solar panel, battery, pump to push the water through the system, a filter to reduce residuals, a carbon based filter, a cartridge of ultrafiltration, a tank, and an ozonater for additional safety. Such units are generally compact such that they do not take up much room in the container while providing potable water for consumption and irrigation.

A micro drip irrigation system is provided to assist the user in providing irrigation to his or her crops. This system preferably a Netafilm DRIPK 4008 Drip Irrigation System which is designed for irrigation of all vegetable types or row crops grown on 1 acre/0.4 hectare fields with 0.8 m dripperline spacing. This system includes all needed components for field installation and operation and is operated by water pressure using a pump or by atmospheric pressure (over 0.2 bar). Alternatively, it is possible to use two DripTech Instakits including; Head Unit with Bypass Assembly, Venturi, Filter, Splitter Assembly, PVC pipe spares, extra PVC components. Sub Unit 900 micron flexible Layflat Submain, Take offs, Layflat punching tool, lateral joiners. Lateral Bag—22 roles of 125-micron UV-stabilized laser punched Drip Tape, 34 rolls of 200 micron UV-Stabilized laser-punched Driptape.

A #8 Submersible Pump Cable, typically 250 feet long, will be connected to s submersible pump from the Grundfos control unit, which supplies the power to the pump. Three wire locking plugs with a pin and wire receptacle is provided to connect the submersible cable from the interior power system to the cable connected to the pump on the exterior. 200 feet of Poly pipe coil flex which will be connected from the pump to the TM200 water meter with a C3/4 inch clamp from the Grundfos 25SQF-7 Submersible pump which at maximum capacity of 1440 watts can produce up to 8000 gallons of water daily from a 125 foot head.

To assist in managing various documentation, a fold down shelf with drawers will be included. There will be a storage compartment for manuals and instruction, manuals for the various components and devices, instructions for operation of the unit and support documentation. An electronic tablet or smart phone preferably is included to assist in storing of data and communication by e-mail. To assist with communication, there is a Sierra GX 440 Modem to enable the connectivity for SMS and wireless and an appropriate antenna for the intended delivery location. The internal cabinets and cabinet doors will be affixed to the unit in an appropriate location.

The following items are provided to assist the user in farming and maintenance operations. This includes a tool box with standard small tools (screwdrivers, wrenches, hammer, etc.), equipment to repair specific areas of need, such as solar panels, electrical devices, drip tape and irrigation lines, etc.; a trowel, D-handled flat spade (39"), shovel, pick, hoe, bow rake, wheelbarrow (Narrow Barrow Green 5 Cu. Ft. Folding WB), U-Bar/"broadfork" (29" width, 4" spacing between forks), watering cans, and chicken wire (1" Mesh) (50 ft for compost plus extra for sifting).

The container can also have multiple types of containment elements that will be stylized for multiple uses, e.g., burlap bags (boxed) for harvest of grain and dry goods that do not need refrigeration; 5 gallon buckets for soil and water, compost, worms, food, etc.; and 50 gallon barrels for seeds and harvest, manure or garbage. Preferably the storage bags or containers are configured and designed to protect the grain or seeds from the elements and insects.

The unit may also contain additional structures or materials for installation of structures, e.g., a bee hive kit and all of the elements that support the hive; and additional chicken wire and a frame for a coop or for fencing. Also, as noted herein, a greenhouse or shadehouse structure can also be erected from provisions that are carried by the innermost container or by construction with or modification of the movable container components of the system.

Figure 22:
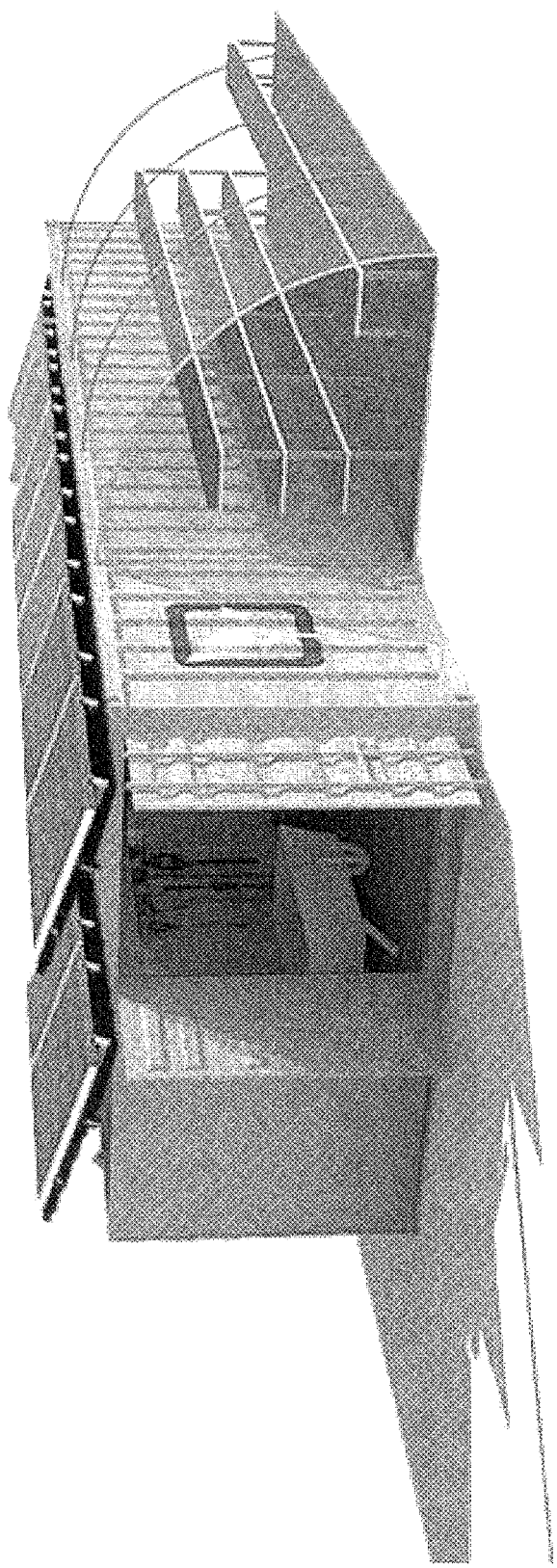
FIG. 22 illustrates the installation of the system with the addition of a shadehouse/greenhouse which is erected onto the non-movable side of the shipping container.

A typical installed system is illustrated in FIG. 22. The system includes a two container arrangement where the expanded container includes the solar panels as described herein. The other container includes a second set of solar panels that are installed after the container is set in place. The larger, non-expandable container includes the water pump and electronics therein, as well as garden tools for farming tools, as well as the material for erecting a greenhouse/shadehouse that, as shown, is attached to a side of the container. The greenhouse/shadehouse is preferably constructed using a tubular frame which has support rods. These rods are attached at one end to the side of the non-expandable container and at the other end to the ground or to an elongated plate that is secured to the ground. The wall of the container is provided with openings so that the support rod ends can be attached and secured thereto by pins or an adhesive. This forms a quarter circle structure that can extend along a portion of or up to the entire length of the container wall.

The support structure is covered with shade cloth, a lightweight knitted polyethylene fabric that provides plants and people with protection from the sun. Shade cloth fabric is available in densities ranging from 30% to 90% to suit the unique needs of different types of plants, flowers and crops. Shade material is rot and mildew resistant, does not become brittle and is water permeable. The shade material may or may not be reflective. Generally, it offers superior ventilation, improves light diffusion and keeps greenhouses cooler for optimum plant horticulture. The components for constructing the greenhouse are provided in the shipping container so that they can be simply removed to erect the greenhouse. Also, the provision of the greenhouse connected to the container provides protect and stability to the greenhouse compared to one that is free-standing.

The interior of the greenhouse/shadehouse can be configured as desired. In the arrangement shown, the structure is provided with racked shelves that are extracted from the innermost container. These shelves hold containers or planters that are provided with seeds or seedlings to start the growing in a protective environment. This shadehouse/greenhouse used to shelters the seedlings and protects them from adverse weather, excessive sunlight, or insects. After the plants have grown to a size that demonstrates their viability, they are replanted in adjacent fields which are provided with the drip irrigation system that is provided by the system and that is stored in the innermost container for shipping.

Figure 23:
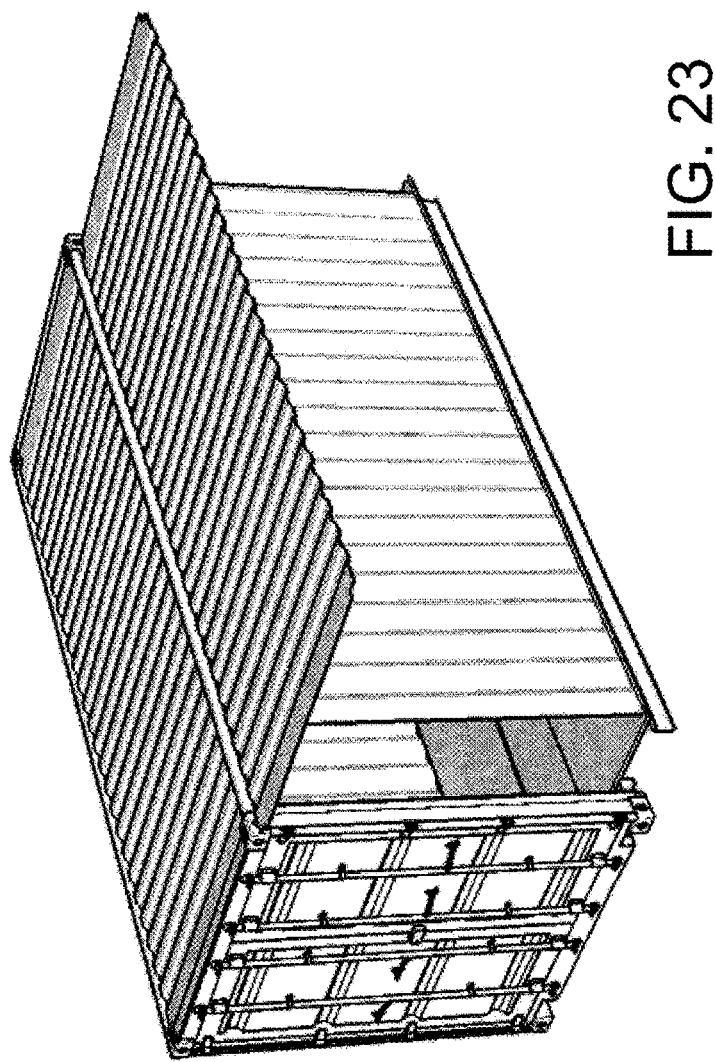
Figure 24:
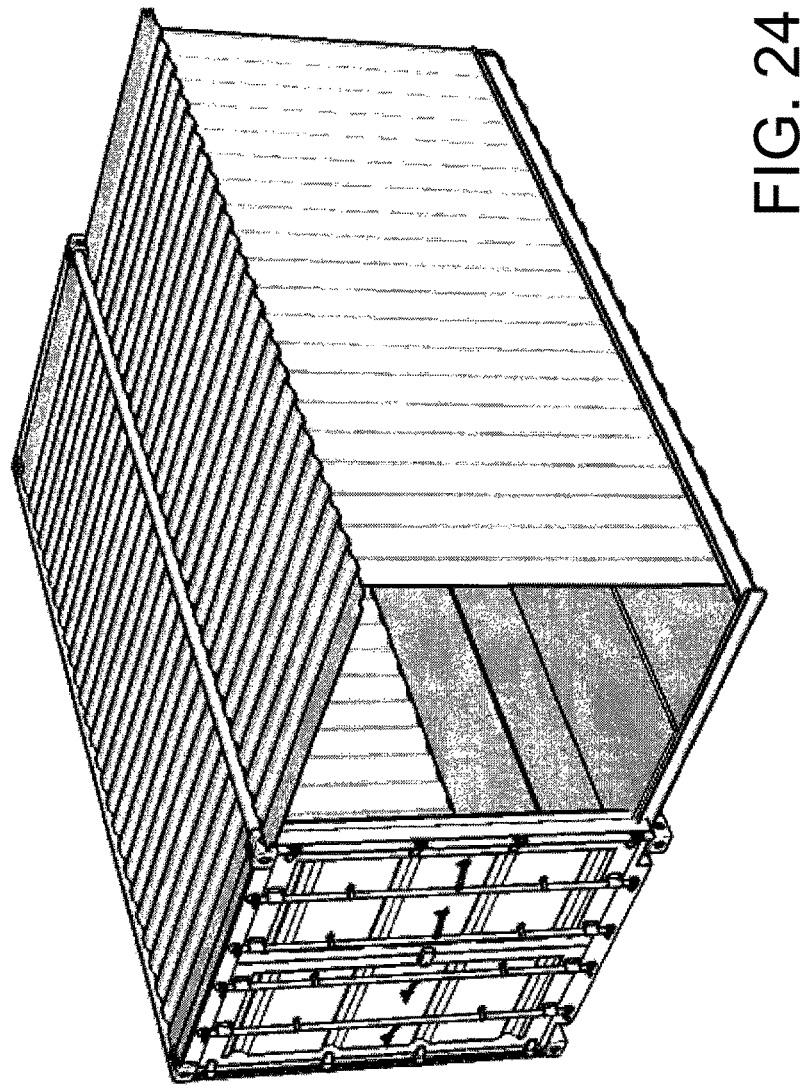

FIGS. 23 and 24 illustrate another expandable container system according to the present invention. In FIG. 23, the outer container includes a side wall that pivots upward to form a further top surface as an extension of the top wall of the shipping container. The side wall is connected by a hinge that extends along the corner of the container. After the side wall is pivoted into position, it is held up temporarily with supports that hold up the forward and rear ends of the side wall. Alternatively, the side wall can include manual hydraulic supports that can be fixed into position to hold the side wall horizontally and adjacent to the top wall of the shipping container.

Once the side wall if positioned horizontally, the inner container can be extracted from within the shipping or outer container. This is done by providing the inner container on wheels or rollers so that it can be pulled out of the outer container. The inner container includes a side wall that was initially located adjacent to the outer side wall that was pivoted upwards, and it is attached to a floor member which is provided with the rollers or wheels for movement along the bottom surface of the outer container. The side wall and floor member are pulled out of the inner container and are then arranged such that the side wall can support the now horizontal pivoted sidewall. The horizontal sidewall then can be affixed to the top of the vertical sidewall to further support the horizontal side wall. This in effect doubles the interior size of the structure. Next wall portions joined to the front and back edges of the front and back openings of the expanded container can be pivoted upwards to that those open areas can be closed. It is alternatively possible to have these wall portions attached to the upstanding corners of the shipping container so that they could be pivoted horizontally about the vertical axis into position to close the inner container openings. Any or all of these wall portions can include doors, vents or other access openings, while solar panels can be provided upon the top wall or horizontal sidewall after erection. The internal components of the inner container would be similar to what has been previously described herein.

FIG. 24 illustrates the side wall of the inner container supporting the horizontal side wall of the outer container. Before these walls are moved, it may be necessary to remove some of the internal components that are being shipped to the jobsite. These can be reinstalled after the structure is completed. The internal components and subsystems would be essentially the same as those described herein for the other embodiments so that they do not need to be repeated here.

Figure 25:
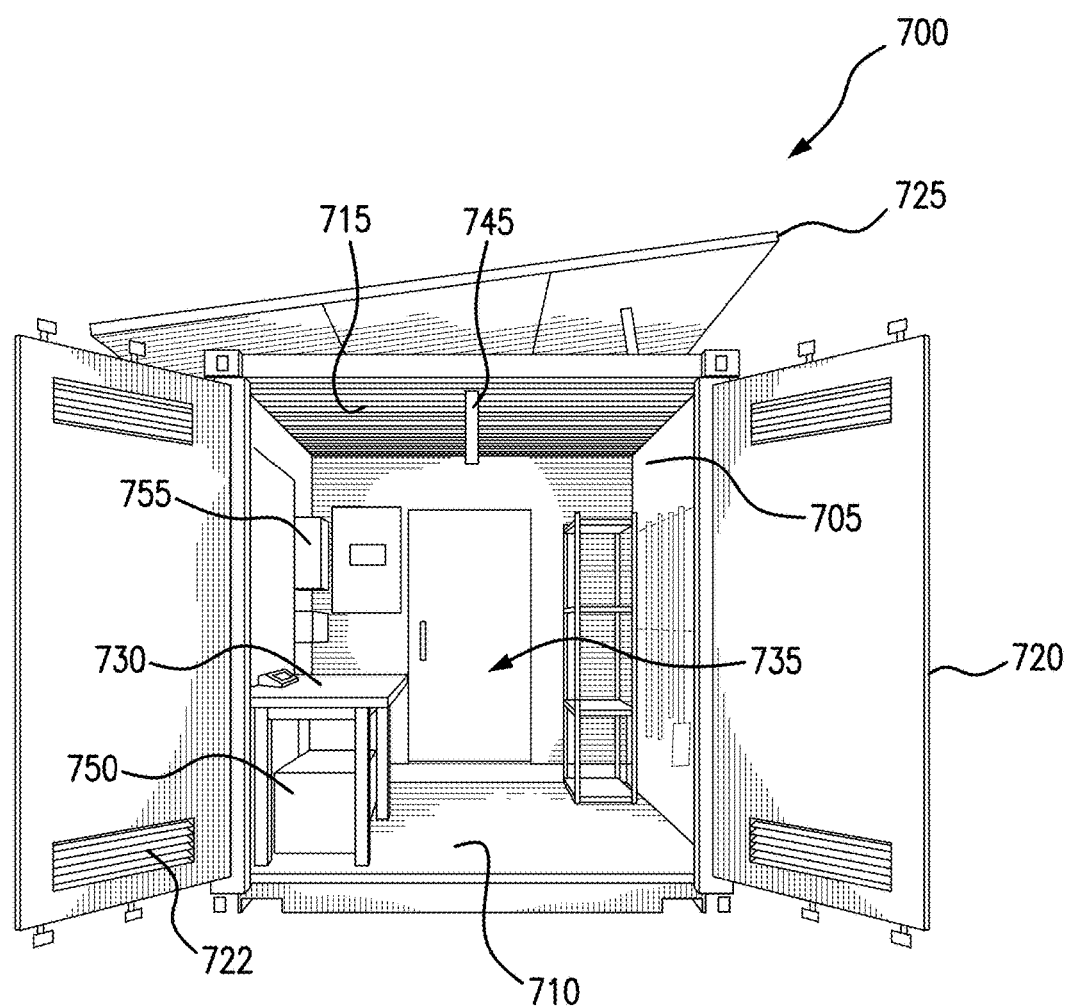
FIG. 25 is an end interior view of a single container according to certain embodiments of the disclosure.

FIG. 25 is an end interior view of a single container 700 according to certain embodiments of the disclosure. In FIG. 25, container 700 includes outer sidewalls 705, a floor/base 710, a roof/ceiling 715 and access doors 720. In some embodiments, doors 720 may include circulation vents 722. In certain embodiments, a solar array 725 may be disposed above the roof 715 exterior to the container 700. For example, the solar array 725 may be a 3 KW array so container 700 may be able to operate off the grid in rural locations. In some embodiments, container 700 may be nested within a larger container, as described above.

In some embodiments, sidewalls 705 and doors 720 are preferably insulated to better maintain an ambient temperature within the container 700. For example, the insulation may be R15 rated. Container 700 may further include a work bench area 730 disposed in an outer room 733 and an interior cold storage room 735. This room can include additional components such as sensors, hydroponic systems, aquaponic systems, wi-fi routers, water harvesting or catchment systems, and these can either be built in or provided as components that can be removed from the room for use outside or adjacent the container. This outer room preferably includes charging stations and electronic control systems, as well as wireless communication devices, tools, agricultural supplies, training information and operation manuals, and tools, agricultural supplies, power and irrigation that are necessary to facilitate growth of sustainable crops. Some of these components can be provided in a further compartment, e.g., a storage closet, where the components can be retained out of the way of other components or where they can be returned when not otherwise in use.

Room 733 may further include interior lighting 745, a storage battery 750 and a controller unit 755. The storage battery can be provided in a separate compartment if desired, or can be located to conserve space, such as by being mounted beneath the work bench.

In certain embodiments, battery 750 is configured to store power from the solar array 725 for use on cloudy days or at night with low solar power. Controller 755 may be configured to electrically connect to the solar array 725 and/or a sensor array. The array may include a variety of sensors, for example, temperature, flow, fluid levels, pressure, pH, conductivity, soil moisture, wind speed, solar irradiation, carbon dioxide, light sensors or amperes for energy consumption/generation. In some embodiments, controller 755 may also be configured to control a variety of devices, for example, pumps, vents, lights, ambient temperature, boilers, actuated values or variable frequency drives (VFDs).

Room 735 may be insulated with an R30 rated insulation. Room 735 may include storage shelves 740 to hold produce to be refrigerated or frozen. Different compartments within the cold storage room can be configured for refrigeration or freezer temperatures. Room 735 can also be operatively associated with the water supply so that ice can be made.

Figure 26:
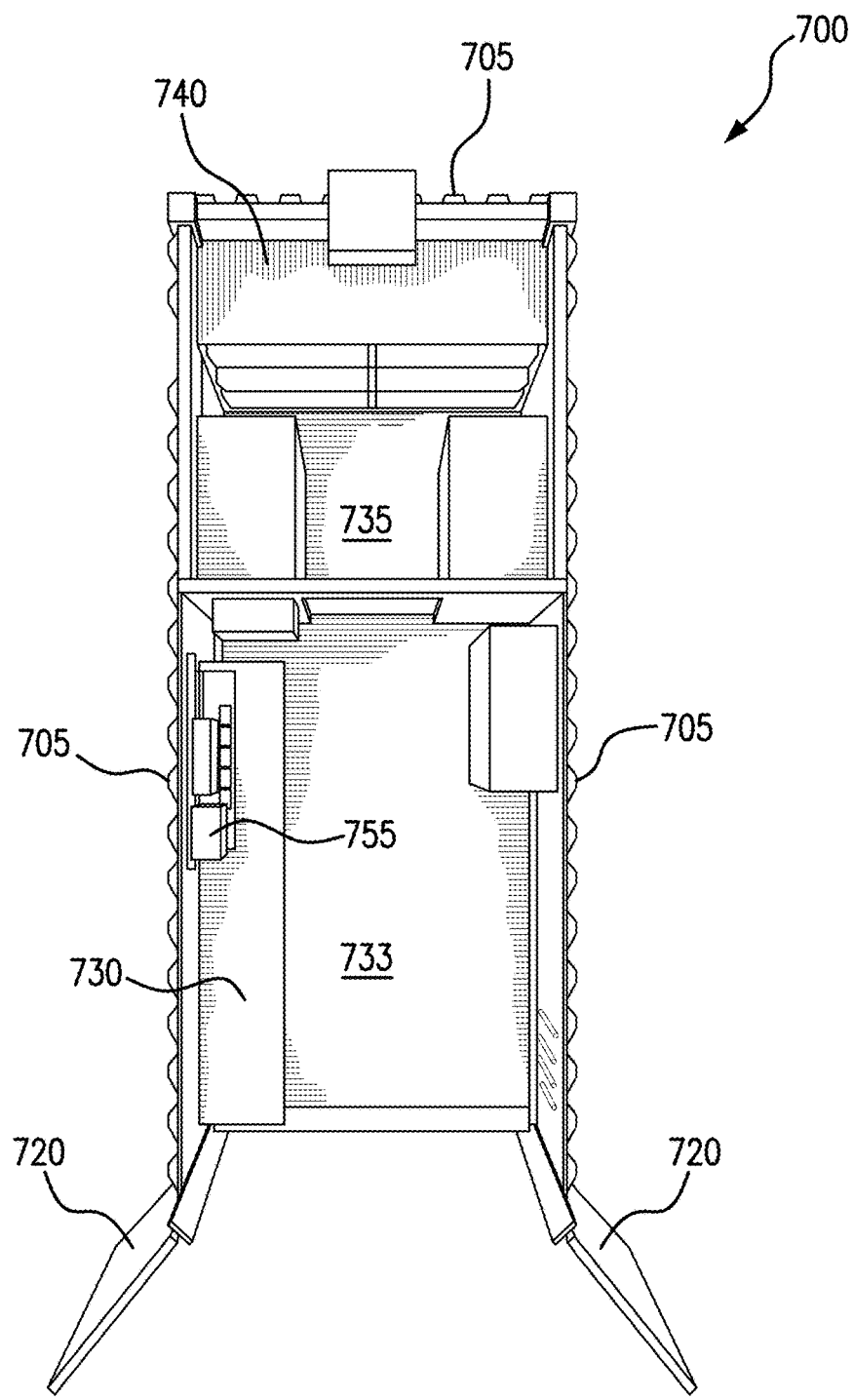
FIG. 26 is a top cross-sectional view of the container of FIG. 25 according to certain embodiments of the disclosure.

FIG. 26 is a top cross-sectional view of the container 700 of FIG. 25 according to certain embodiments of the disclosure. In FIG. 26, container 700 the cold storage room 735 including shelves 740 and outer room 733 including work area 730 are illustrated. In certain embodiments, work area 730 may include a work bench disposed over battery 750 as shown in FIG. 25. In some embodiments there may be a wall mounted A/C unit to maintain an ambient interior temperature while the container 700 is disposed in harsh climates. In certain embodiments, outer room 733 may also include interior shelving for storage purposes and tool racks to hold farming tools or the like.

Figure 27:
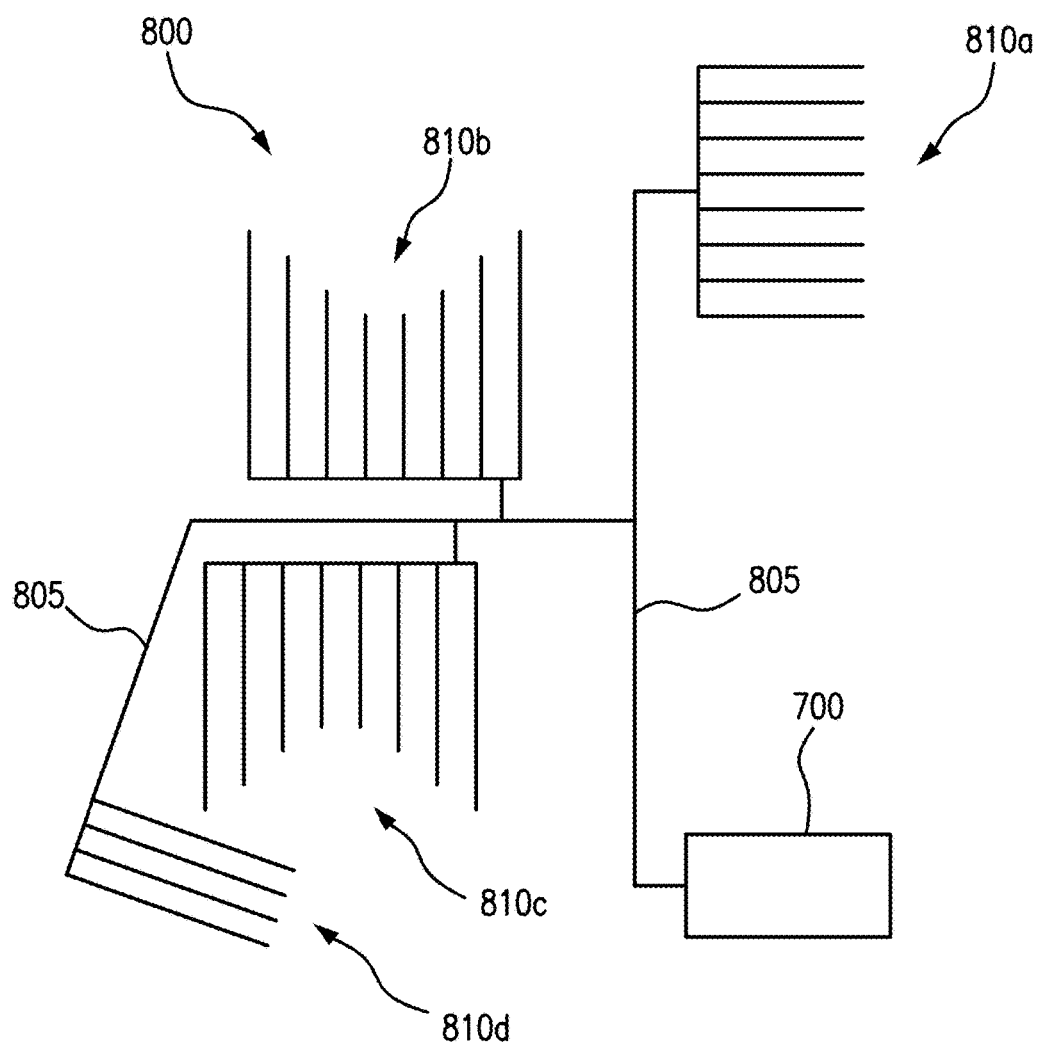
FIG. 27 is a schematic illustration of an irrigation system of the container of FIG. 25 according to certain embodiments of the disclosure.

FIG. 27 is a schematic illustration of an irrigation system 800 of the container 700 of FIG. 25 according to certain embodiments of the disclosure. This irrigation system is generally provided associated with and outside of the primary or innermost container and is used to assist in farming operations. The system is pre-installed and secured directly to the outside of the container. The drip irrigation system is operatively associated with the water pump and is configured to be provided or installed in adjacent fields to provide irrigation for crops.

In FIG. 27, container 700 is fluidly connected to irrigation system 800 via a drip irrigation feed pipe 805 and pumps which are connected to container 700 from a water source, such as a well or water storage tanks. Feed pipe 805 is fluidly connected to a drip irrigation 810a, 810b, 810c and 810d as shown. In some embodiments, drip irrigation 810a may irrigate a plot of kale, lettuce or tomatoes and the like, while drip irrigation 810b may irrigate a plot of peppers, beets or onions and the like, while drip irrigation 810c may irrigate a plot of peaches and mangos or the like, and while drip irrigation 810d may irrigate a plot of grape vines or the like to facilitate crop rotation needs which maintaining soil nutrients.

Another aspect of the invention relates to various methods for assisting in the implementation and generation of agricultural activities to assist farmers in quickly and efficiently forming a farm environment that facilitates the growing of crops in a remote location utilizing the containers and systems of the present invention. As disclosed, the containers of the invention can be shipped to any particular location, including those where farm implements and items to assist in growing crops are not generally available. The containers can then be expanded as noted herein to form a farming structure. The structure will be powered by the solar panels or other renewable energy sources, with excess power stored in the battery system. The contents of the container can be removed to set up irrigation, grow initial plant seedlings or seeds in trays on the shelves or in the greenhouse. The necessary tools and equipment for preparing the soil, installing the irrigation system, collecting water for use in the irrigation and for planting the seedlings are all available in the container, which also can be locked at night to securely store the equipment therein. The contents of the container enables the initial growing of crops such that the crops that are grown can generate seeds that can be used for later plantings. A key component of the container is the water system which not only supplies the plants with needed irrigation but also which purifies the water for human or animal consumption. Also, the storage tanks can collect rainwater for these uses. The electronics that are provided allow the farmer to keep track of the necessary horticulture of the plants and the operation of the pumps, irrigation or other systems provided by the container. Finally, the container includes components for wireless communication to allow the farmer to provide reports on the agricultural activities to third parties who can then assess how to enhance crop production.

Any or all of the features of the container can be used for growing crops according to the method of the present invention, whether in a remote area or in any location where a farm is to be established. The containers can also be tailored for the particular location where they are to be used, e.g., tailoring the plants or seedlings for optimal growing in the climate where the container is to be delivered. The delivery can be by ship, rail or truck as the container is sized to be handled with conventional equipment for loading and transport in and by those forms of transportation in the same manner as conventional cargo containers.

Although the disclosure has been provided and illustrated in connection with preferred embodiments, the present invention can, however, be embodied in many different forms and should not be construed as limited to the preferred embodiments set forth herein; rather, these preferred embodiments are provided so that this disclosure will be thorough and complete, and will fully convey the scope of the invention to those skilled in the art. The present invention may be implemented with different combinations of structural components. It will be appreciated by those skilled in the art that changes could be made to the embodiments described herein without departing from the broad inventive concept thereof. For example, the solar cells could be replaced or supplemented by one or more small wind turbines when the containers are to be used in areas that have higher winds. Combinations of different types of renewable energy can also be used. It is understood, therefore, that this invention is not limited to the particular examples disclosed, but it is intended to cover modifications within the spirit and scope of the invention as defined by the appended claims.

What is claimed is:

1. A farm from a box system for providing a user with all necessary components for conducting farming operations, comprising:
    a self-contained shipping unit containing components necessary for conducting farming operations, the unit comprising at least one container including a primary container and various system components arranged and pre-installed therein for transport or shipping, with the unit having an opened or compartmented configuration to provide access to the system components for use thereof;
    with the unit containing:
        a regenerative power component for providing power to electrical components of the system;
        a plurality of core system components arranged within and attached to a primary container with the components including:
        an electrical sub-system to store and distribute electrical power, which includes a storage battery, lighting and electrical controls; and
        a water purification and distribution system that includes a water pump and filtration system;
    wherein the regenerative power component is operatively associated with the core components to facilitate operation of the lighting, water pump and other core components to allow farming operations to be conducted outside of the system from the components provided thereby;
    wherein the primary container comprises a first generally rectangular container having a top, a bottom, two ends, and two sides, with the sides being wider than the ends, and includes the lighting and water pump, a water filter, a drip irrigation system to assist in farming operations, an internal cold-storage refrigeration system configured to hold and maintain food products therein, and a charging system, wherein the drip irrigation system is capable of providing irrigation to rows of crops grown on 1 acre/0.4 hectare fields with 0.8 m dripperline spacing, and is operatively associated with the water pump and configured to be deployed externally in fields adjacent to the container to provide irrigation for crops, and with the storage battery configured to power the water pump and lighting; wherein the charging system is operatively associated with the regenerative power component and is configured to charge the storage battery, while also being electrically wired and configured to supply power to one or more components which include the internal cold-storage refrigeration system and one or more or all of sensors, hydroponic systems, aquaponic systems, wi-fi routers, water harvesting and catchment systems, charging stations or electronic control systems; and
    wherein the primary container includes at least two compartments one of which comprises a cold storage room formed within the primary container and the other of which includes an outer room, wherein the cold storage room comprises the internal cold-storage refrigeration system.

2. The system of claim 1, wherein the components are located in the outer room and include sensors, hydroponic systems, aquaponic systems, wi-fi routers, water harvesting and catchment systems, charging stations and electronic or data control systems with these components also being powered by the energy management system.

3. The system of claim 1, wherein the outer room further comprises wireless communication devices, tools, agricultural supplies, training information and operation manuals, and tools, agricultural supplies, power and at least three different water access kits for municipal water, ground well water and river or lake water to facilitate growth of sustainable crops.

4. The system of claim 1, wherein at least one end of the first container comprises two access doors for ingress and egress.

5. The system of claim 4, wherein the first container includes one or more access ports, panels or vents located on the ends or sides.

6. The system of claim 1 further comprising a second generally rectangular container configured and dimensioned to fit outside the primary container for shipment, the second container having a top, a bottom, two ends one closed side and one open side, wherein the open side of the second container includes a wall section that is associated with the top of the second container and extends towards the top of the primary container to close the space between the top of the second container and the top of the primary container when the second container is configured for transport or shipping; and
    a movement mechanism positioned between the first and second containers;
    wherein the regenerative power supply is a retractable solar panel assembly that is mounted upon the top of the primary container and disposed adjacent the wall section associated with the top of the primary container;
    wherein the closed side of the primary container forms one of the sides of the second container when positioned inside the second container, and the top of the primary container is spaced from the top of the second container to provide sufficient clearance for the retractable solar panel assembly;
    wherein the primary container that houses the core components therein is movable into and out of the second container by the movement mechanism from a first position where the primary container is positioned inside the second container for shipment to an extended position where the primary container is substantially completely removed from within the second container.

7. The system of claim 6, wherein the movement mechanism includes wheels or rollers provided upon the bottom of the primary container and first and second tracks or rails associated with the bottom of the second container and located beneath the wheels or rollers of the primary container to allow movement of the primary container between the first and second positions.

8. The system of claim 6, wherein the second container includes one or more access ports located on the ends or closed side, wherein one access port is a pull down or sliding door that forms part of the closed side.

9. The system of claim 6, wherein an end of the second container disposed at a joint between the closed side and the bottom includes one or more supports for supporting the bottom of the second container when in the second position.

10. The system of claim 1, wherein one of the containers includes an additional structure in collapsed form for erection of a greenhouse or shadehouse along a side of the first container, the structure including a pop-up, half dome, quarter circle skeleton frame of supports and a covering of netting, shade cloth or greenhouse plastic, wherein the supports and covering are present inside the container for shipment, and then can be withdrawn to erect the structure, with the supports attached to the side of the container, provided with the netting, cloth or plastic and then locked into place upon erection.

11. The system of claim 1 wherein one side of the primary container includes at least two movable panels, with a first panel hingedly connected to the top of the container to pivot upwardly to form the top of an expanded container section; and with a second panel hingedly connected to the bottom of the container to fold downwardly to form a floor of the expanded container, wherein the first panel includes a further panel hingedly connected thereto on a side that is opposite to that where the first panel is connected to the top of the container, with the further panel pivotable downwardly form the unfolded first panel to form an outer wall of the expanded container, and wherein the second panel include first and second further panels connected to sides of the second panel that are perpendicular to the hinged connection, such that after the second panel is unfolded, the first and second further panels can be pivoted upwards to form sides of the expanded container section.

12. The system of the claim 1 wherein a side wall of the primary container includes at least four movable panels, with a first panel hingedly connected to the bottom of the container to pivot downwardly to form the floor of an expanded container section; and with a second panel hingedly connected to the first panel to pivot upwardly to form a vertical back wall for the expanded container section, with the second panel including two half panels hingedly connected thereto on each side to pivot outwardly to swing into position to forming the side walls of the expanded container.

13. The system of claim 6 wherein the open side of the second container includes a foldable floor section that is pivotably joined to the bottom of the second container so that the floor section can pivot from a first position where it is positioned generally vertically with respect to the bottom of the second container when in the first position to a generally horizontal position in line with the bottom of the second container when the second container is in the expanded configuration.

14. The system of claim 6 wherein the second container includes one or more access ports located on the ends or closed side, wherein one access port is a horizontal panel that forms an upper part of the closed side and that pivots upward to form an extended ceiling at the top of the second container to provide complete access into the second container through that side.

15. The system of claim 1 wherein the primary container includes one or more access ports, doors or vents located on the ends or sides, wherein the access port is a horizontal panel that forms a lower part of the other side and that pivots downward to form an extended floor from the bottom of the primary container.

16. The system of claim 15 wherein the access port is a horizontal panel that forms an upper part of the closed side and that pivots upward to form an extended ceiling at the top of the first container to provide complete access into the first container through that side.

17. The system of claim 6 further comprising a third generally rectangular container configured and dimensioned to receive the first and second containers therein for shipment.

18. The system of claim 17 wherein the third container includes a movement mechanism comprising a slidable track associated with the bottom of the second container and upon which the second container is seated to allow movement of the second container from within the third container.

19. The system of claim 1 which includes a water meter, and at least 200 feet of plastic piping for connecting the pump to the water meter with the pump having a maximum capacity of 1440 watts to produce up to 8000 gallons of water daily from a 125 foot head.

\* \* \* \* \*